(12) United States Patent
Berzins et al.

(10) Patent No.: US 11,207,864 B2
(45) Date of Patent: Dec. 28, 2021

(54) COVERING ARRANGEMENT FOR AN ANIMATRONIC OR ROBOTIC ARRANGEMENT

(71) Applicant: The Creature Technology Company PTY LTD, Port Melbourne (AU)

(72) Inventors: Debra Berzins, Newport (AU); Sonny Tilders, Yarraville (AU); Jennifer O'Keefe, Altona Meadows (AU); Andrew Thilby, The Basin (AU)

(73) Assignee: The Creature Technology Company PTY LTD, Port Melbourne (AU)

(*) Notice: Subject to any disclaimer, the term of this patent is extended or adjusted under 35 U.S.C. 154(b) by 157 days.

(21) Appl. No.: 15/567,714

(22) PCT Filed: Apr. 22, 2016

(86) PCT No.: PCT/AU2016/050291
§ 371 (c)(1),
(2) Date: Oct. 19, 2017

(87) PCT Pub. No.: WO2016/176720
PCT Pub. Date: Nov. 10, 2016

(65) Prior Publication Data
US 2018/0117875 A1   May 3, 2018

(30) Foreign Application Priority Data
May 1, 2015   (AU) .................................. 2015901575

(51) Int. Cl.
*B32B 3/10* (2006.01)
*B32B 5/18* (2006.01)
(Continued)

(52) U.S. Cl.
CPC ................. *B32B 5/18* (2013.01); *A63H 9/00* (2013.01); *B32B 3/266* (2013.01); *B32B 5/028* (2013.01);
(Continued)

(58) Field of Classification Search
CPC .... A63H 9/00; B32B 3/10; B32B 3/18; B32B 5/028; B32B 5/18; B32B 5/22;
(Continued)

(56) References Cited

U.S. PATENT DOCUMENTS 2,606,398 A * 8/1952 Miller ...................... A63H 9/00
 446/385
3,025,200 A * 3/1962 Powers ...................... C08J 9/38
 428/357

(Continued)

FOREIGN PATENT DOCUMENTS

CN   101574553 B   6/2014
GB   2 207 080 A   1/1989

OTHER PUBLICATIONS

International Search Report and Written Opinion for International Application No. PCT/AU2016/050291, dated Jun. 16, 2016, 10 pages.

*Primary Examiner* — Zachary M Davis
(74) *Attorney, Agent, or Firm* — Wolf, Greenfield & Sacks, P.C.

(57) ABSTRACT

A covering arrangement for an animatronic arrangement, the covering arrangement having a laminated structure comprising: an outer stretchable polymer layer having a thickness of between 0.5 to 5 mm; and a foam layer configured to provide desired bulk and form to the covering arrangement, wherein the foam layer comprises a shaped foam preform formed from precast flexible foam sheets.

18 Claims, 9 Drawing Sheets

(51) Int. Cl.
*B32B 5/32* (2006.01)
*B32B 7/08* (2019.01)
*B32B 7/12* (2006.01)
*B32B 25/20* (2006.01)
*B32B 27/12* (2006.01)
*B32B 3/26* (2006.01)
*A63H 9/00* (2006.01)
*B32B 25/04* (2006.01)
*B32B 5/02* (2006.01)
*B32B 27/40* (2006.01)
*B29C 51/14* (2006.01)
*B29C 37/00* (2006.01)

(52) U.S. Cl.
CPC .................. *B32B 5/32* (2013.01); *B32B 7/08* (2013.01); *B32B 7/12* (2013.01); *B32B 25/045* (2013.01); *B32B 25/20* (2013.01); *B32B 27/12* (2013.01); *B32B 27/40* (2013.01); *B29C 37/0025* (2013.01); *B29C 51/14* (2013.01); *B32B 2255/02* (2013.01); *B32B 2255/10* (2013.01); *B32B 2255/26* (2013.01); *B32B 2266/0278* (2013.01); *B32B 2307/51* (2013.01); *B32B 2307/546* (2013.01); *B32B 2307/732* (2013.01); *B32B 2457/00* (2013.01); *B32B 2556/00* (2013.01)

(58) Field of Classification Search
CPC .. B32B 5/24; B32B 5/245; B32B 5/32; B32B 25/045; B32B 27/00; B32B 27/06; B32B 27/065; B32B 27/10; B32B 27/12; B32B 2266/0278; G09B 23/28; G09B 23/281; G09B 23/283; G09B 23/285; G09B 23/286; G09B 23/288; G09B 23/30; G09B 23/33
See application file for complete search history.

(56) References Cited

U.S. PATENT DOCUMENTS

| | | | |
|---|---|---|---|
| 5,066,259 A | 11/1991 | Acker | |
| 2003/0124952 A1* | 7/2003 | Marine | A63H 3/36 |
| | | | 446/385 |
| 2010/0056715 A1* | 3/2010 | Wang | A63H 9/00 |
| | | | 524/588 |
| 2012/0153533 A1 | 6/2012 | Tye et al. | |

* cited by examiner

COVERING ARRANGEMENT FOR AN ANIMATRONIC OR ROBOTIC ARRANGEMENT

CROSS-REFERENCE

CROSS-REFERENCE TO RELATED APPLICATIONS

This application is a national stage filing under 35 U.S.C. § 371 of international application PCT/AU2016/050291, filed Apr. 22, 2016, which claims priority to Australian application 2015901575, filed May 1, 2015, the disclosures of which are incorporated by reference herein in their entireties.

TECHNICAL FIELD

The present invention generally relates to a covering arrangement for an animatronic or robotic arrangement, more particularly a lightweight covering arrangement for an animatronic figure or body. The invention is particularly applicable as a skin covering for a large, typically greater than human sized animatronic figure or creature such as a dinosaur, animal used in an entertainment venue, ride or show such as a theme park or amusement park and it will be convenient to hereinafter disclose the invention in relation to that exemplary application. However, it is to be appreciated that the invention is not limited to that application and could be used as a covering of other types of bodies such as static figures or creatures in a variety of locations and settings.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

The outer covering or skin of articulated and/or animatronic figures are required to meet a number of requirements including durability, aesthetics (realistic look) and flexible movement. In order to meet these requirements, the skin of existing animatronic figures, such as theme park creatures, is formed from a heavy and thick silicone rubber and dense foam construction. This type of skin is heavy and necessitates very high strength and over engineered animatronic framework structures and articulation mechanism to support and articulate that type of skin. Additionally, the skin is difficult to repair due to the dense material construction.

In other instances, the outer covering or skin arrangements of articulated bodies can comprise a moulded laminated structure of flexible silicone layer and a cast foam arrangement. In these arrangements, for example as taught in U.S. Pat. No. 5,066,259, the foam section is cast (foamed and cured) within a mould so as to be formed in the desired configuration within the skin arrangement. Forming the foam layer in this manner provides the desired bulk and configuration for this section of the arrangement. However, the resulting foam structure can be non-uniform due to contours, recesses and other features in which the foaming composition can pool and be contained in the moulded shape creating an uneven foam density within the structure. Movement and flexibly of the skin arrangement can therefore be compromised. Furthermore, casting foam structures in this manner can be uneconomical when producing covering arrangements for large scale animatronic figures such as dinosaurs, dragons and other large creatures.

It would therefore by desirable to provide an alternative or improved covering arrangement for animatronic figures. Such a covering would preferably provide a light weight yet durable alternative to existing thick silicone and dense foam skin arrangements. The skin would preferably also be more easily repaired when damaged.

SUMMARY OF THE INVENTION

A first aspect of the present invention provides a covering arrangement for an animatronic arrangement, the covering arrangement having a laminated structure comprising:

an outer stretchable polymer layer having a thickness of between 0.5 to 5 mm; and a foam layer configured to provide desired bulk and form to the covering arrangement, wherein the foam layer comprises a shaped foam preform formed from precast flexible foam sheets.

The covering arrangement of the present invention has been developed to provide a lighter weight, durable, and flexible alternative to existing thick stretchable polymer and dense foam skin arrangements for animatoric arrangements, particularly large, typically greater than human sized animatronic arrangements. In particular, the required the foam layer provides a lightweight, repairable support structure for the outer stretchable polymer layer. The skin has the advantage of being easier to repair due to the differences in properties of the various layers. The strength of the foam layer or layers alleviates the need for a thick stretchable polymer surface and the related issues and disadvantages of this type of skin. A thin (0.5 to 5 mm thick) outer stretchable polymer layer is only required in the covering arrangement of the present invention to provide the requisite flexible textured external outer layer. The resultant covering arrangement (or skin) combines the stretchiness and cast-ability of stretchable polymers, for example silicone rubber, with a lightweight combination of construction foams for support, body and strength. Furthermore, lightweight skins and coverings also advantageously provide a more dynamic and lifelike movement to an animatronic figure, as the covering is able to flex and move with more freedom compared to heavier conventional counterparts.

The covering arrangement of the present invention also allow lighter and more dynamic underlying articulated bodies and structures to be built as the light weight of the skin places less load requirement on members and articulation devices of the structure and framework of the animatronic arrangement or figure. Lightweight skins also provide for a much more serviceable articulated or animated figure (AF). The use of service flaps in the covering arrangement become more manageable and user friendly, as these can be more easily manipulated by a user (due to lighter weight) and fixings within the structure of the articulated/animatronic figure suffer far less stress. Heavier skins, particularly thick cast silicone polymers, tend to capitulate and wear under their own weight. Repairs therefore become more difficult as a heavy skin weight concentrates loads on any weak point. For the present invention, repairs to the foam layer can be glued and/or sewn to mend any tears or other damage to this part of the covering arrangement. Similarly, the stretchable polymer layer can be fixed using adhesive or adhering an appropriate stretchable polymer patch to the damaged section of the covering arrangement.

The animatronic arrangement of the present invention preferably comprises large, typically greater than human sized animatronic arrangements for example an animal, creature, dinosaur, beast or the like. The structure of the covering arrangement of the present invention is ideally suited for covering the large surface area of such large animatronic arrangements, ultilising bulk quanties of preformed foam sheets to form the covering arrangement. The use of foam sheet is generally more economical for large scale covering arrangements.

It should be appreciated that the moulded laminated structure of the present invention provides an integrally connected structure between the outer stretchable polymer layer and the foam layer. Importantly, the structure is moulded together in order to provide shape and configuration to the covering arrangement as well as reinforcing the connection between these layers. In exemplary embodiments the outer stretchable polymer layer and the foam layer are laminated together integrally without the use of an intermediary adhesive having a different composition to the outer stretchable polymer layer and the foam layer. In these embodiments, the outer stretchable polymer layer and the foam layer are laminated together via the outer stretchable polymer layer setting or drying onto the foam layer, thereby interconnecting and/or fusing with the connecting structure of the foam layer. This forms a strong bond between the layers and integrally connects the layers into the moulded laminated structure thereof.

The outer stretchable polymer layer is designed as the outer visual surface of the covering arrangement providing the desired visual features of the creature or figure the covering arrangement is intended to mimic. The outer stretchable polymer layer is preferably durable and flexible. Advantageously, this layer is thinner compared to previous skin arrangements used in theme parks. The outer flexible layer has a thickness of between 0.5 to 5 mm, preferably between 1 to 4 mm, and even yet more preferably between 1 to 3 mm.

The outer stretchable polymer layer can comprise any suitable castable, flexible and stretchable polymer material. In exemplary embodiments, the outer stretchable polymer layer comprises a silicone material, preferably a silicone rubber. However, it should be appreciated that other castable polymers, such as urethanes, in particular polyurethane rubber or latex compositions could equally be used.

In particular embodiments, the outer stretchable polymer layer can be produced from any suitable curable silicone material. Whilst any number of silicone compositions may be suitable, it is preferred that the outer stretchable polymer layer comprises a flexible, stretchy silicone rubber. It should be appreciated that silicone rubber is an inorganic synthetic elastomer made from a crosslinked silicon-based polymer reinforced with filler. Silicone rubbers are widely used in industry, and there are multiple formulations. For this particular application, the silicone rubber used is preferably a Platinum Cure silicone (as opposed to Tin Cure). In one preferred form, the silicone rubber comprises a silicone rubber from the Dragon Skin Series silicones available from Smooth-On, Easton Pa. 18042, United States of America, more preferably Dragon Skin shore 10. However, it should be appreciated that other equivalent propertied silicone rubbers could equally be used.

A variety of functional additives may be included in the stretchable polymer formulation, in particular a silicone rubber formulation where required. Additives include (but are not limited to): micro-powders, colour additives, UV resistance additives, antistatic additives, waxes or the like.

The stretchable polymer material of the outer stretchable polymer layer can include weakness points and/or portions due to the flexible, stretching nature of the material. These points of weaknesses are preferably reinforced using a mesh material. Accordingly, in some embodiments the covering arrangement further includes at least one section of mesh material positioned to reinforce at least one portion of the outer stretchable polymer layer. The portions of the outer stretchable polymer layer that are reinforced can comprise any number of formations or sections. For example, ridges and/or folds in the outer stretchable polymer layer typically comprise a point of weakness. Accordingly, these ridges and/or folds on the inner surface (i.e. that surface which faces the foam layer) of the outer stretchable polymer layer is reinforced with the mesh material. Similarly, where the covering arrangement includes a connection section is connectable to at least one fastening or manipulation device, the covering arrangement including at least one section of mesh material on the outer stretchable polymer layer positioned in a location that reinforces the portion of the connection section proximate the outer stretchable polymer layer. The mesh material can have any configuration suitable to reinforce the relevant section of the outer stretchable polymer layer. In some embodiments, the mesh material comprises elongate strips of mesh reinforcement material.

The mesh material can have any suitable configuration and composition. The mesh material preferably resists tearing, provides support for stitches and adds strength in high stress areas of the outer stretchable polymer layer. In some embodiments, the mesh material comprises stretchable polymer infused reinforcement mesh. In some embodiments, the mesh material comprises power mesh. However, it should be appreciated that any suitable flexible and/or elastic mesh material may be used. The power mesh material preferably has a thickness of 0.2 to 2.5 mm, preferably 0.2 to 2 mm. The power mesh material is preferably between 170 and 180 GSM, preferably about 175 GSM.

Each layer of the covering arrangement is preferably adhered or affixed to an adjoining layer. This can be accomplished by any number of suitable means. In preferred embodiments, the layer of the covering arrangement is adhered to an adjoining layer by an adhesive. Any suitable adhesive may be used. For example, the adhesive may comprise a resin or rubber of at least one of: silicone, polychloroprene, or combination thereof. However, it should be appreciated that other suitable adhesives could equally be used.

The foam layer is configured to provide both form and bulk to the covering arrangement. This can be provided by a single foam element or a number of combined foam elements.

The foam layer of the covering arrangement of the present invention is formed from a shaped foam preform formed from precast flexible foam sheets, preferably precast flexible polymeric foam sheets. It should be appreciated that precast flexible foam sheets comprise foam sheets which are formed by a separate or independent formation process (involving foaming and curing steps to form a foam sheet) and are provided in sheet form for use in the foam layer of the present invention. These precast foam sheets are shaped and contoured into a shaped foam preform having a desired configuration. It is noted that this differs to a number of prior art processes including foam products, in which the foam layer is cast insitu in the product and foamed thereon to form the contours. The foam layer of the present invention is configured using soft flexible foam sheets which are shaped and contoured into the desired preform configuration.

Advantageously, the use of precast or preformed foam sheets enables the foam layer to have substantially uniform foam properties throughout that layer. Pre-formed foam sheets typically have uniform or generally uniform properties through the bulk sheet foaming process (typically on a flat surface or similar) used to form the foam sheets. This therefore ensures that the foam preform also has generally uniform foam properties. In comparison, when a foam layer is cast insitu to form a preformed shape, for example in a mould or other casting body, the foaming process can be non-uniform due to contours, recesses and other features in which the foaming composition can pool and be constrained. This can result in varing densities and properties throughout the resulting cast foam product. Moreover, precast or preformed foam sheets are selected for their structural consistency and greater strength with lesser densities contributing to the lightweight qualities of the invention.

In some embodiments, the precast flexible foam sheets comprise precast soft flexible foam sheets. It should be appreciated that soft flexible foam sheets encompass foam sheets preferably having an apparent density of between 15 to 100 kg/m$^3$, more preferably between 15 to 50 kg/m$^3$. The precast flexible foam sheets are preferably compressible, bendable and/or pliable.

It should be appreciated that precast flexible foam sheet encompass sheets, panels, plys, slabs, plates, leaves or the like of precast flexible foam.

In some embodiments, the foam layer comprises a single foam element. This foam layer may comprise at least one body layer for providing the form and configuration of the foam layer.

In other embodiments, the foam layer comprises a combination of two or layers. These layers preferably have different functions and properties. For example, the foam layer may include at least two foam layers comprising: at least one body layer for providing the form and configuration of the foam layer; and at least one contoured foam layer for providing shape and stiffness to the foam layer. The two different foam layers or elements therefore provide different advantageous properties to the overall foam layer.

The body layer or layers are designed to provide the form and configuration of the foam layer. The body foam layer is preferably supple and yielding with a strong shape memory. The body layer may therefore comprise a soft foam, preferably comprising a stretchable polymer foam, and more preferably a flexible polyurethane foam.

The contoured foam layer or layers are designed to provide shape and stiffness to the foam layer. The contoured foam layer is preferably structural, stitchable and has a strong shape memory. The contoured foam layer may therefore comprise a reticulated polymer foam, and more preferably reticulated polyurethane foam. It should be appreciated that reticulated foam is a porous, low density solid foam. In this context, reticulated means having a structure like a net. This structure of reticulated foams leads these to foams to be extremely open foams having few, if any, intact bubbles or cell windows.

It should be appreciated that the choice of foam for the body layer and contoured foam layer can be dependent on the application. For example, it would be desirable to use a non-water retentive foam where the covering arrangement is used in an outdoor setting.

Each of the body foam layer and reticulated foam layer may comprise a single or alternatively two or more layers affixed together. In some embodiments, the contoured foam layer comprises at least two or more shaped sections joined together to provide the foam layer with a selected form and configuration. Two or more shaped sections may be joined together by any suitable means including thread, fasteners, adhesives or combination thereof. In preferred embodiments, the shaped sections are stitched together to form a selected configuration, to provide for example a desired topology and/or shape.

The contoured foam layer typically is a stiffer layer to the body foam layer due to the properties of the foam comprising this layer. The contoured foam layer can therefore include at least one articulation aperture, preferably a plurality of articulation apertures located within each shaped section. It should be appreciated that the use of such articulation apertures is known in the art as cheese ghosting. Thus, in embodiments where the contoured foam layer comprises a laminated structure of two affixed layers, those two layers preferably comprise an articulation layer formed from reticulated foam including a plurality of articulation apertures, and a backing layer formed from reticulated foam onto which the articulation layer is affixed. The articulation layer may or may not be formed from the same type of reticulated foam as the backing layer.

The laminated structure of the contoured foam layer can be used to lay materials or other fixtures between the two layer structure. Thus, in some embodiments sections of mesh material are set between the articulation layer and backing layer aligned with connection or manipulation sections of the covering arrangement. This allows certain sections of the contoured foam layer to be reinforced, thereby strengthen those sections for wear through force application and/or repetitious use.

The foam layer preferably has a thickness of 10 to 100 mm, preferably 20 to 50 mm. Where the foam layer comprises a contoured foam layer and a body foam layer, it is preferred that the contoured foam layer has a thickness of 5 to 30 mm, preferably 7 to 20 mm. Similarly, it is preferred for the body foam layer to have a thickness of 20 to 60 mm, preferably 20 to 50 mm. However, it should be appreciated that the thickness of the foam layer or layers is best be determined by the final application, the sculptural form of the section of the articulated/animatronic body, the nature and range of the movement and the like.

The present invention also relates to a covering arrangement for an animatronic arrangement formed from two or more joined sections of covering arrangement according to the first aspect of the present invention.

A second aspect of the present invention relates to the method of forming the laminated structure of the covering arrangement. This second aspect provides a method of forming at least one section of a covering arrangement for an animatronic arrangement, the method comprising:

forming an outer stretchable polymer layer having a thickness of between 0.5 to 5 mm in a mould, the outer stretchable polymer layer having an outer surface and an inner surface;

forming a foam preform having a desired form and bulk suitable for a selected section the covering arrangement, wherein the foam layer comprises a shaped foam preform formed from precast soft flexible foam sheets; and adhering the foam preform to the inner surface of the outer stretchable polymer layer, thereby forming a section of the covering arrangement.

The mould can have any suitable configuration. In some embodiments, the mould comprises a shaped mould such as a textured mould having textured mould surfaces which provide the desired texture and shape to outer surface of the outer stretchable polymer layer. In other embodiments, the mould could be a stencil mould or flat stencil mould. The mould typically comprises a two part mould having a moulding section and a cover section, preferably a textured mould section and a press mould section. The textured mould provides the desired textured outer surface to the outer stretchable polymer layer. In some embodiments, the textured mould surfaces and shape of the mould are formed from negative moulding on a sculpted form. This technique allows the detail of the surface of the outer stretchable polymer layer to be produced in detail. The mould can comprise one or a mixture of different mould sections and components. In some embodiments, the mould comprises a fiberglass mould. In such an embodiment, both the press mould section and the tectured mould section comprise fiberglass mould sections. Moreover, it should be appreciated that the mould could be made of other materials such as silicone or plaster. It should also be appreciated that the mould can incorporate one or more vacuum bags. For example, vacuum bags can be used with a textured mould section (as the press mould section) for example to compress and/or mould the material within the press mould section. Thus in embodiments the mould includes one or more vacuum bags. In some embodiments, the mould includes one mould section formed from a fiberglass section (i.e. either the press mould or textured mould section) and one section formed from a vacuum bag (i.e. either the press mould or textured mould section).

In some embodiments, the mould comprises a vacuum bagging process, with vacuum bags being used for both the textured mould section and the press mould section. This vacuum bagging mould arrangement can apply similar even pressure to the foam during the lamination curing time. However, it should be appreciated that this particular mould embodiment is only suited to shallow open moulds with less complicated contours.

The stretchable polymer layer can be applied to the mould, using any suitable technique. In some embodiments, the stretchable polymer layer is applied to the mould using a brush application technique. In other embodiments, the stretchable polymer layer is applied to the mould using pouring techniques. In preferred embodiments, the stretchable polymer layer is applied to the mould using a spray applicator. A number of stretchable polymer layers are sprayed into the mould to produce the desired thickness. In some embodiments, more than 2 layers are applied, and preferably between 3 and 5 layers. The layers are preferably sprayed using a scatter pattern spray technique. A spray applicator advantageously provides full and even coverage to the mould surface with only a thin coating of sprayed material.

It can be advantageous to integrally colour the outer stretchable polymer layer on formation. This therefore reduces or alleviates the need to apply a colour coating, for example paint or similar pigments to the outer surface of this layer after it is formed. Therefore, some embodiments the step of forming an outer stretchable polymer layer in a mould comprises:
  coating the inner mould surface of the mould with a stretchable polymer pigment thereby forming a colour coated mould surface;
  applying a stretchable polymer layer to the mould including the colour coated mould surface; and
  drying the resulting coloured stretchable polymer layer.

Again, sections in the outer stretchable polymer layer can be reinforced using a mesh material. Thus in some embodiments, the method further includes the step of:
  adhering at least one section of mesh material to the inner surface of the outer stretchable polymer layer positioned to reinforce at least one portion of the outer stretchable polymer layer to form, in combination with the outer stretchable polymer layer, a reinforced outer layer, and
  thereafter adhering the foam preform to the reinforced outer layer to form a section of the covering arrangement.

It should be appreciated that typically a single layer of mesh material is applied. However, in alternate embodiments, two or more layers could be applied to provide additional reinforcement. Furthermore, in some embodiments, the step of adhering at least one section of mesh material comprises:
  infusing the mesh material with stretchable polymer; and
  mounting the mesh material to at least one portion of the inner surface of the outer stretchable polymer layer.

The mesh material is preferably adhered to the outer stretchable polymer layer through the application of pressure. Here the step of adhering at least one section of mesh material preferably further comprises:
  applying pressure to the mesh material, preferably moulding (more preferably vac-bag moulding) the mesh material whilst the mesh material dries onto the inner surface of the outer stretchable polymer layer.

The foam preform is preferably patterned or filleted to fit the form of the mould. As discussed above, the foam layer can comprise a single foam layer or in other forms two different foam layers adhered together. Where the foam layer comprises two or more layers adhered together, the step of forming the foam preform can comprise: laminating together at least one soft foam body layer for providing the form and configuration of the foam layer and at least one contoured foam layer for providing shape and stiffness to the foam layer. It should be appreciated that depending on the application a single foam layer may also be sufficient.

The contoured foam layer may in some embodiments be formed from two or more layers of reticulated foam. The step of forming the foam preform preferably further comprises: forming the contoured foam layer from two or more layers of reticulated foam, the layers including at least one articulation layer including a plurality of articulation apertures, and at least one backing layer onto which the articulation layer is affixed. In such embodiments, the contoured foam layer may be formed from a pattern including two or more interconnecting sections which are attached to form a contoured layer. Again, depending on the application a single foam layer may also be sufficient.

The various layers of the covering arrangement are preferably adhered together using an adhesive. Thus, the step of forming the foam preform preferably further comprises: attaching the foam body layer to the contoured foam layer using an adhesive, such as a contact adhesive or silicon. Similarly, the step of adhering the foam preform to the reinforced outer layer preferably comprises: applying an adhesive to the complementary surfaces of the foam preform and the reinforced outer layer; locating the foam preform in a cooperative location in the mould on the reinforced outer layer; and sealing the mould thereby laminating the foam preform and the reinforced outer layer together.

It should be appreciated that the overall covering arrangement of an articulated body/animatronic arrangement is typically manufactured from a plurality of individually formed sections of covering arrangement which are joined together once formed. In such embodiments, at least two sections of the covering arrangement according to the present invention are joined together to form the overall covering arrangement. Each of these sections of covering arrangement is designed with the required outer surface texture, form and configuration for a designated part of the overall covering arrangement. Where at least two sections of the covering arrangement are joined together, the at least two sections of the covering arrangement preferably include cooperating edge formations, the cooperating edge formation of each layer abutting and adhered to an adjoining cooperating edge formation of each layer. The adjoining foam layers of abutting sections of the covering arrangement are preferably joined using an adhesive or silicone and fabric. Similarly, the adjoining reinforced outer layers of abutting sections of the covering arrangement are preferably joined together using an adhesive or silicone.

In exemplary embodiments the outer stretchable polymer layer and the foam layer are laminated together integrally without the use of an intermediary adhesive having a different composition to the outer stretchable polymer layer and the foam layer. In these embodiments, the outer stretchable polymer layer and the foam layer are laminated together via the outer stretchable polymer layer setting or drying onto the foam layer, thereby interconnecting and/or fusing with the connecting structure of the foam layer. This forms a strong bond between the layers and integrally connects the layers into the moulded laminated structure thereof. For example, where the outer stretchable polymer layer comprises a silicone composition, the layers are laminated together using that silicone composition.

The covering arrangement of the present invention is intended to be used as the external skin or covering for an articulated sub structure having the purpose to appear and move like a living creature. Otherwise known as an animatronic figure or creature they can take the form of any creature be it real or fantasy, living or extinct, humanoid or animal, fish or amphibian, jellyfish or insect, for that matter any biological form you could imagine. The applications for these animatronic figures range across but are not limited to the live entertainment, theatrical, film and television, exhibition and museum, educational and medical fields.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

The present invention provides a light weight, durable, and flexible covering or skin arrangement for an articulated body such as an animated or animatronic creature or figure used in a display, entertainment show or venue such as a museum or theme park. The system can be used in indoor and outdoor situations and applications. The skin arrangement has a laminated multilayer structure in which each layer has been selected to provide particular advantageous properties to the overall laminated structure.

Figure 1:
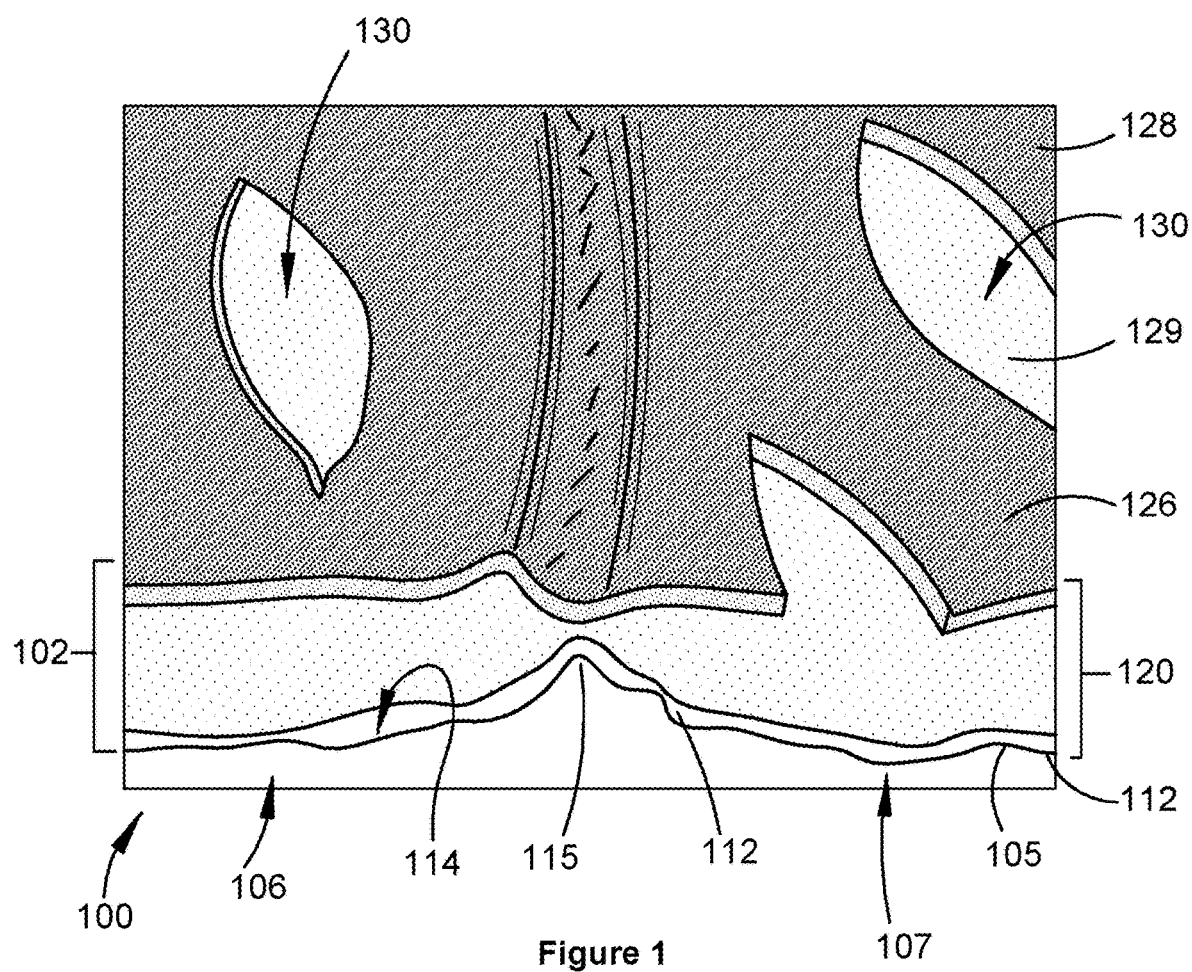
FIG. 1 illustrates a cross-section of a covering arrangement according to one embodiment of the present invention.

FIG. 1 shows a cross-section of the laminated layers structure 102 of one embodiment of a covering arrangement 100 according to the present invention. The illustrated laminated layers structure 102 has a multilayer structure.

Starting from the top layer shown in FIG. 1, the multilayer structure comprises an outer stretchable polymer layer 105 which provides the outer visual layer of the covering arrangement 100. This layer provides the external visual aesthetics, and is therefore required to have the desired texture, colour and flexibility to matching the creature or other figure the covering arrangement 100 is designed to clad. In the illustrated embodiment, the outer stretchable polymer layer 105 comprises a thin moulded silicone material, preferably a flexible, stretchy silicone rubber. The outer stretchable polymer layer 105 is a moulded form formed from a curable liquid silicone rubber composition (the process of which is described in more detail below).

The outer surface 107 of this stretchable polymer layer 105 is typically textured, for example to mimic the texture of an animal skin such as an elephant or dinosaur. This texture is taken from the textured surface of a mould from which that layer of the skin is formed. This moulding process will be explained in more detail later in the specification. The outer surface 107 is also has a desired colour, which is imparted using suitable silicone dyes or pigments applied when moulding that layer (again explained in more detail later in the specification). Silicone colour is therefore intrinsically laid into the silicone outer surface 107.

Where applicable, areas of the outer stretchable polymer layer 105 that require extra strength are reinforced using a mesh material layer 110. It should be appreciated this step is optional, as in some cases no reinforcement may be needed. Sections, typically elongate strips of mesh material 112 are positioned ridges or peaks lines (for example 115 in FIGS. 2 and 4) on the inner surface 114 of the outer stretchable polymer layer 105. These ridges or peaks lines may also comprise lines of articulation of the outer stretchable polymer layer 105. For example, a central peak section 115 on the inner surface 114 of the outer stretchable polymer layer 105 can be seen in the section 106 of covering arrangement 100 shown in FIG. 1.

The bulk, form and shape of the covering arrangement 100 are provided by foam layer 120. The illustrated foam layer 120 is a combination of two types of foams laminated together to form a shaped structure. These foams are:

- At least one body layer 124 for providing the form and configuration of the foam layer. The body layer 124 is typically a soft foam, such as a stretchable polymer foam, for example a flexible polyurethane foam. This soft foam gives a light weight bulk to the covering arrangement 100 (and sections thereof) and also has the required flexibility to allow each particular section of covering arrangement 100 to flex and more when manipulated on the articulated body. For outdoor applications, it is preferred the foam structure does not retain water. In such applications, a pool furniture type reticulated foam that does not retain moisture could possibly be used; and
- At least one contoured foam layer 126 for providing shape and stiffness to the foam layer. The contoured foam layer is typically a reticulated polymer foam, for example a reticulated polyurethane foam. The contoured foam layer 126 provides a flexible contoured shape to the foam layer 120 which is shaped and formed to hold in specific configuration but can also be flexed and articulated to move.

Each of the body layer 124 and contoured foam layer 126 are formed from precast flexible foam sheets shaped and formed into a specific configuration. It should be appreciated that the choice of foam for the body layer 124 and contoured foam layer 126 can be dependent on the application. For example, it would be desirable to use a non-water retentive foam where the covering arrangement is used in an outdoor setting. Moreover, the use of both a body layer 124 and contoured foam layer 126 is also dependent on the application. In some embodiments, the foam layer 120 may only comprise one or more body layer or layers 124. No contoured foam layer 126 may be used.

The contoured foam layer 126 typically comprises at least two or more shaped sections which are adhered (stitched and glued) together to have a selected topology, form and configuration. The contoured foam layer 126 can also comprise a laminated structure of two layers 128, 129 of reticulated foam. In the illustrated embodiment, the contoured foam layer 126 is formed from an articulation layer 128 comprising reticulated foam which includes a plurality of articulation apertures 130 (known as cheese ghosting, described below), and a backing layer 129 formed from reticulated foam onto which the articulation layer 128 is affixed. However, it should be appreciated that in other embodiments, the contoured foam layer 126 may not include an articulation layer 128. In some embodiments, sections of mesh material (not visible in FIG. 1), preferably power mesh material, is set between the articulation layer 128 and backing layer 129 aligned with connection or manipulation sections of the covering arrangement 100. This laminated structure is more clearly illustrated later in the specification where the process of forming the contoured foam layer 126 is discussed in more detail.

The resultant covering arrangement 100 combines the stretchiness and cast-ability of silicone with a lightweight combination of construction foams and netting for support, body and strength.

These properties are provided by the desired properties of the individual laminated layers:

outer stretchable polymer layer 105—desired to be durable and flexible. It provides the external surface texture and finish. It is the castable layer that will conform to any moulded surface form or texture;

mesh material 112—desired to resists tearing, provide support for stitches and adds strength in high stress areas of the outer stretchable polymer layer 105. Its open weave nature allows it to absorb silicon (important for bonding) and maintain a reasonably high level of stretch once integrated into the other layers a body foam layer 124—desired to be supple, yielding and have a strong shape memory; and a contoured foam layer 126—desired to be structural, stitchable and have a strong shape memory.

The foam layers 124 and 126 provide for and assists with the durability of the silicon by sharing any loads, tensions or other forces acting upon it. Additionally it provides structural support to the silicon so that it holds its form more readily.

Whilst a number of materials are available which meet the above structural properties, the layers of the covering arrangement of the present invention may in some embodiments be formed from the following materials:

outer stretchable polymer layer 105—a flexible, stretchy silicon rubber such as the Dragon Skin Series silicones, preferably Dragon Skin shore 10, available from Smooth-On, Easton Pa. 18042, United States of America;

mesh material 112—Power Mesh—a dance wear mesh with four way stretch. However, it should be appreciated that in other cases a less stretchy material may be preferable, such as along the edges of the outer silicone layer;

a body foam layer 124—a flexible polyurethane foam sheet or sheets such as "Econo" Foam from Joyce Foam Products, Moorebank, NSW, Australia (see MSDS provide in Appendix 1); and a contoured foam layer 126—a reticulated foam sheet or sheets such as Meracell Reticulated Polyester/Polyether Foam from Joyce Foam Products, Moorebank, NSW, Australia (see MSDS provide in Appendix 2).

It should be appreciated that the Dragon Skin Series silicones available from Smooth-On, Easton Pa. 18042, United States of America are high performance platinum cured silicone rubbers that can be mixed 1A:1B by weight or volume and cure at room temperature with negligible shrinkage. The cured silicone material is strong and stretchy. It has a high degree of stretch and will rebound to its original form without distortion over many cycles. This type of silicone rubber is therefore suitable for making high performance moulds and is used in many special effects applications, especially animatronics where repetitive motion is required. The material is water tight translucent and will accept pigments for creating colour effects. This silicone provides the following advantageous properties (Dragon Skin 10—measured after 7 days at 23° C.).

Mix Ratio: 1A: 1B by weight or volume
Mixed Viscosity, cps: 23,000 (ASTM D-2393)
Specific Gravity, g/cc: 1.07 (ASTM D-1475)
Specific Volume, cu. in./lb.: 25.8 (ASTM D-1475)
Color: Translucent
Shore A Hardness: 10 A (ASTM D-2240)
Tensile Strength, psi: 475 (ASTM D-412)
100% Modulus, psi: 22 (ASTM D-412)
Elongation @ Break: 1000% (ASTM D-412)
Die B Tear Strength, pli: 102 (ASTM D-624)
Shrinkage, in./in.: <0.001 (ASTM D-2566)

Nevertheless, it should be appreciated that other silicone rubbers providing similar properties could equally be used for the outer stretchable polymer layer 105.

Silicone Skin Manufacturing Process

The method of manufacture of the covering arrangement of the present invention is a stepwise process in which each of the individual layers are individual formed and adhered together in a compression mould 140 (FIG. 9) to form the final laminated structure 102 shown in FIG. 1. It should be appreciated that Velcro adhered to the mould can be used to retain the foam in some situations.

It is to be understood that the overall covering arrangement 100 of an articulated or animated body is typically manufactured from a plurality of individually formed sections 106 of covering arrangement 100 which are joined together once formed. Each of these sections 106 of covering arrangement 100 is designed with the required outer surface texture, form and configuration for a designated part of the overall covering arrangement 100. However, each section 106 of the covering arrangement 100 is formed in a generally similar process or method. The method involves the following basic steps:

1. Forming an outer stretchable polymer layer 105 in a mould 140;
2. Optionally, adhering at least one section of mesh material 112 to the inner surface 114 of the outer stretchable polymer layer 105. For example aligned along the at least one line of articulation 116 or along the edges of the covering arrangement 100 to form a reinforced outer layer 160 (FIG. 4); and
3. Forming a foam preform 170 (FIG. 9) having a desired form and bulk suitable for a selected section 106 the covering arrangement 100, and adhering the foam preform 170 to the outer stretchable polymer layer or where appropriate the reinforced outer layer 160.

Each of these three steps will now be described in more detail:

Step One—Forming the Outer Stretchable Polymer Layer

Figure 2:
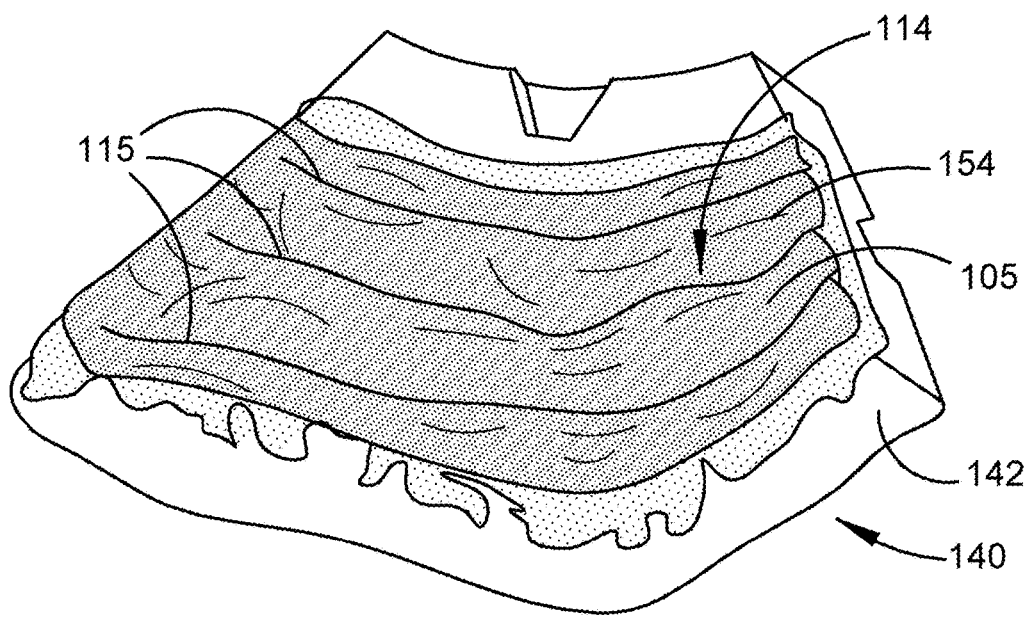
FIG. 2 illustrates a texture mould with outer stretchable polymer layer applied.
Figure 3:
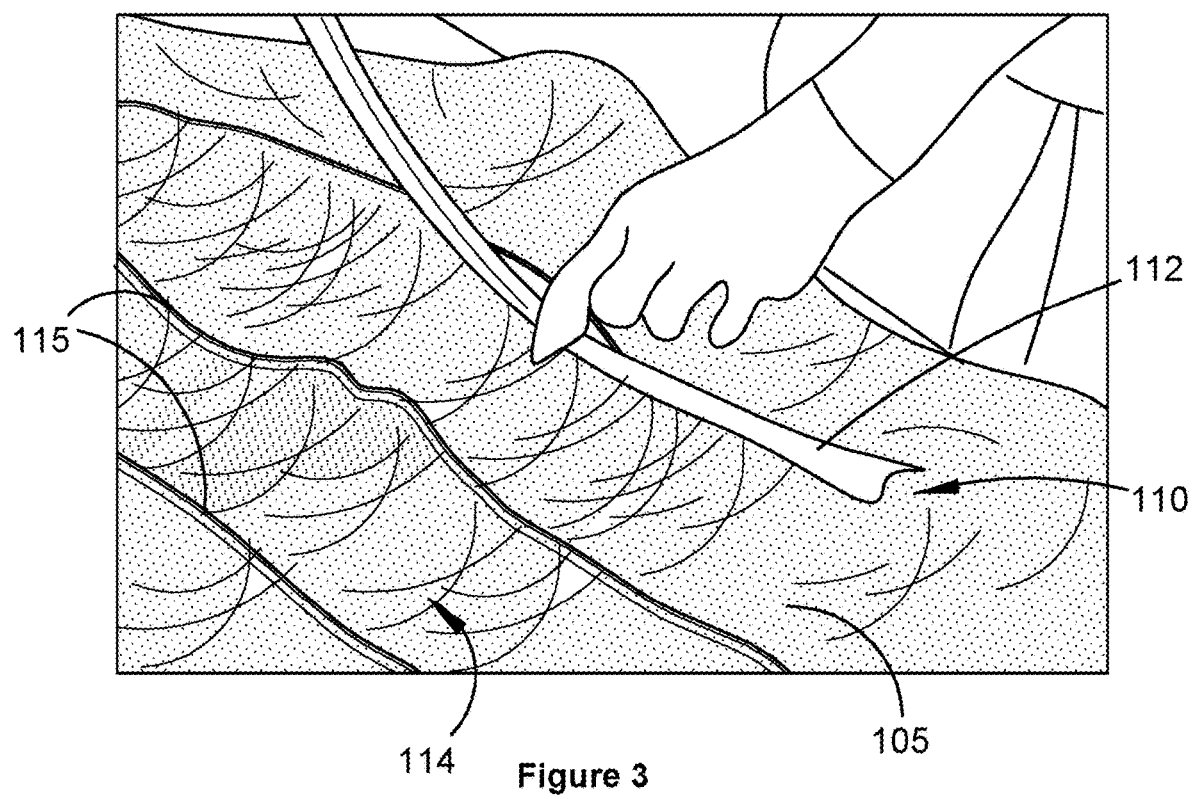
FIG. 3 illustrates the step of applying a mesh reinforcing material to the inner surface of the outer stretchable polymer layer shown in FIG. 2.
Figure 9:
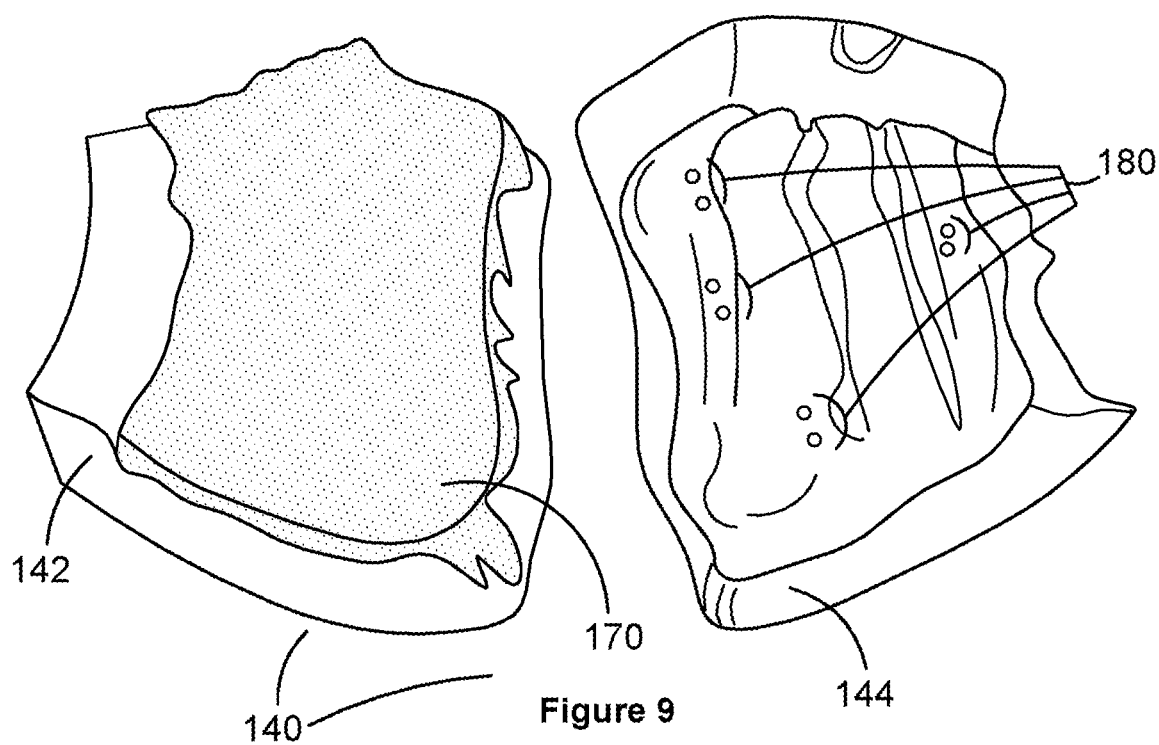
FIG. 9 illustrates the step of placing foam preform into the mould shown in FIGS. 2 to 4.

The outer stretchable polymer layer 105 is formed in as a moulded layer in a textured resin and fibreglass mould 140, shown in FIGS. 2 to 4 and 9. As shown in FIGS. 2 and 9, the illustrated mould 140 has two fibreglass mould pieces 142, 144, comprising an outer textured mould 142 in which the silicone outer layer is formed and an interior "press" mould 144 which closes the outer textured mould 142 once all of the layers of the covering arrangement section 106 are placed together in the laminated structure 102, and allows these layers to be pressed together to form the desired contoured shape (as described below). As should be appreciated, a variation on the illustrated two mould 140 structure is where an undercut is placed into the sculpt and another mould is required to achieve the shape. Furthermore, in alternate embodiments a single textured mould could be used, with weights, other bodies of the like used to compress the laminate therein. One of the inner surfaces 152 of the textured mould 142 has a textured surface 154 (FIG. 2—underneath polymer layer 105). This textured surface 154 is contoured to provide the desired skin surface texture and form for a particular covering arrangement section 106, including ridges 115.

The texture and shape of the mould 140 is formed using a negative mould technique, in which the mould 140 is cast from a preformed sculpt (not illustrated in the drawings) providing the desired shape and texture outer surface 107 of that covering arrangement section 106. In this process, the detail of the outer skin texture is typically sculpted in a sculpting material such as plasticine, oil based clay or similar sculpting material. Once the required texture and detail is formed, the approved detail sculpt (again not shown) is walled in a sculpting material, again such as plasticine, to form a desired shaped mould cavity and shaped section 108. A release agent is applied to the textured surface of the sculpt prior to the application of the resin and the fibreglass. The desired colour pigment for the covering arrangement section 106 is either applied as a coloured gel coat layer or incorporated with a resin and applied to the texture side 154 of the moulds 140.

The sculpt is used to form the mould 140 of each covering arrangement section 106. The outer textured mould 142 includes the textured surface 154 providing the desired shape and texture outer surface 107. The outer stretchable polymer layer 105 is therefore formed by painting applying the textured surface 154 of the mould 140 with intrinsic colour using for example an air brush and stippling or paint brush, or pouring. The silicone material can be applied to the textured surface 154 of the textured mould 142 once the intrinsic colour and layer of back up colour is applied. It should however be appreciated that in other embodiments intrinsic silicone painting could alternatively be used. The desired silicone rubber is applied to the outer textured mould 142 as a curable liquid silicone rubber composition using a silicone spraying device. However, it should be appreciated that other techniques could equally be used.

The curable liquid silicone rubber composition is preferably a silicone elastomer known as Dragon skin shore 10 (as discussed previously). For the illustrated embodiment, multiple passes of silicone rubber (with back up colour) was applied using a "silicon III" silicone spray machine (or similar apparatus) to produce the outer layer 105 in the outer textured mould 142 shown in FIG. 2. A number of stretchable polymer layers are sprayed into the textured mould 142. The number of layers is between 1 to 50, though typically more than 2 layers, such as between 3 and 5 layers are applied. The resulting outer stretchable polymer layer had a thickness of between 1 to 3 mm. The outer layer 105 is then allowed to air dry/cure. However, drying/curing could be assisted using heating techniques if desired.

In alternate embodiments, where a silicone sprayer is not available, the silicone could be stippled and/or brushed or poured onto the appropriate surfaces of the textured mould 142.

Step Two—Optionally Adhering the Mesh Material

Strips of mesh material 112, such as power mesh or other suitable mesh are adhered to selected areas on the inner surface 114 of the outer stretchable polymer layer 105. It should be appreciated that power mesh is a lightweight, four-way stretch fabric having strength, body and resilience. Power mesh fabric is formed from a polymer such as nylon or a mixture of polymers such as nylon and spandex (for example 90% nylon and 10% spandex) to provide the required strength, flexibility and elastic properties.

Figure 4:
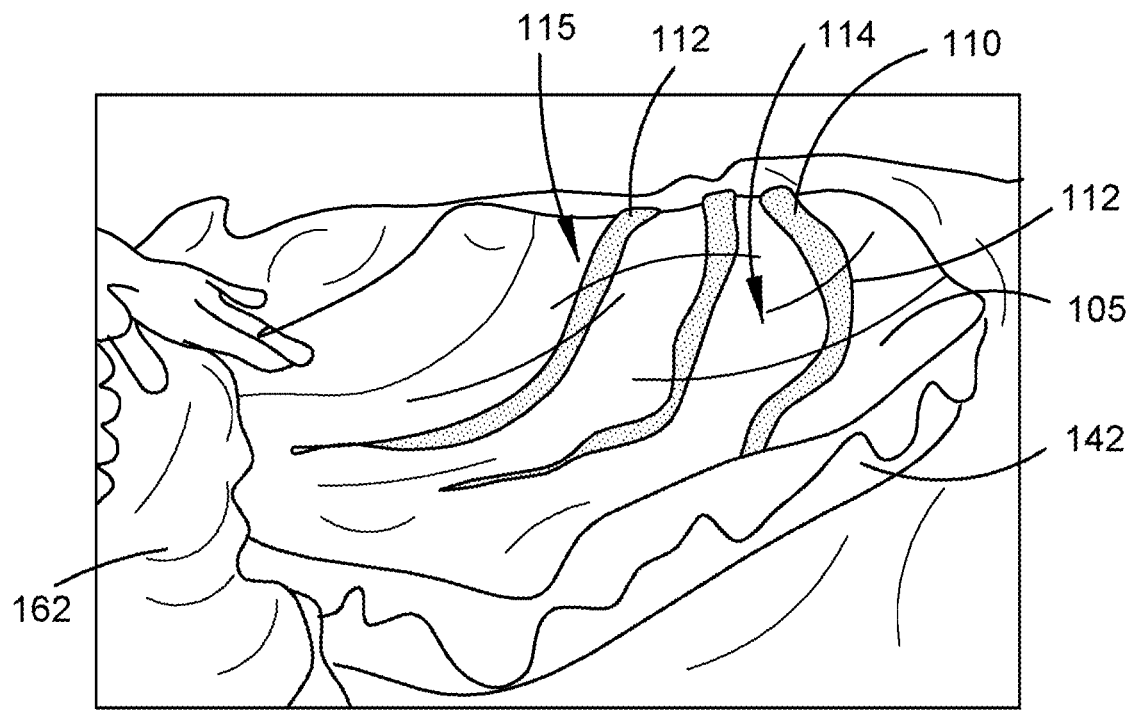
FIG. 4 illustrates the step of vacuum bagging the reinforced outer stretchable polymer layer resulting from the step shown in FIG. 3.

Strips of this mesh material 112 is adhered to the inner surface 114 of the outer stretchable polymer layer 105 aligned along at stress or weak points in the outer stretchable polymer layer 105 for example ridges 115 or folds in the covering arrangement, and/or lines of articulation of the covering arrangement 100. It should be appreciated that typically a single layer of mesh material 112 is applied. However, in alternate embodiments, two or more layers could be applied to provide additional reinforcement. Once applied, the outer layer 150 and reinforcing mesh material combine to form a reinforced outer layer 160 (FIG. 4). Mesh material or other suitable material 112 is also applied to or proximate to any areas where hair knotting and/or reinforcements for fastening and/or manipulation features such as paddles are located and areas for hair application (discussed below).

The mesh reinforcing strips 112 are infused with silicone either before laying or after laying on the outer stretchable polymer layer 105. The reinforced outer layer 160 (FIG. 4) is then placed in a vacuum bag 162 and the air removed from the vacuum bag to apply a uniform pressure on the mesh reinforcing strips 112 whilst the mesh strips 112 dry in place. It is noted that the intrinsic layer with back up colour is left in place on the mould 142, undisturbed during this process. It should be appreciated that vacuum bagging may be required for some applications.

Step 3: Forming and Adhering the Foam Preform

A foam preform 170 for the covering arrangement section 106 is formed whilst the reinforced outer layer 160 is drying. As shown in FIG. 9, the foam preform 170 (FIG. 9) has a desired form and bulk suitable for a selected section 106 the covering arrangement 100.

In the illustrated embodiment, the foam preform 170 is a combination of two types of foams laminated together or applied separately to form a shaped structure. These foams are:

1. at least one soft foam body layer 124 for providing the form and configuration of the foam layer. The body layer 124 is typically a stretchable polymer foam, for example a flexible polyurethane foam; and
2. At least one contoured foam layer 126 for providing shape and stiffness to the foam layer. The contoured foam layer 126 is typically a reticulated polymer foam, for example a reticulated polyurethane foam.

Whilst the illustrated embodiment uses two foam layers, it should be appreciated that in other embodiments as single soft body foam layer 124 could be used. In such an embodiment, no contoured foam layer 126 is used.

The foam preform 170 is patterned or filleted to fit the form of the textured mould 142. Each of the foam body layer 124 and contoured foam layer 126 is formed from planar (for example cardboard) patterned forms 127 (see FIG. 5) created using a patterning process in which the relationship between the foam and the press/texture moulds 142/144 is recorded by way of notches and marks for an accurate fit in the final product. The patterning process employs standard pattern making techniques as would otherwise be engaged in the costume making and millinery trades. In some embodiments during this patterning process that the articulation apertures 130 (known as "cheese ghosting") of the contoured foam layer 126 is considered in accordance to the direction of anticipated movement of that section 106 of the covering arrangement 100. However, it should be appreciated that articulation apertures 130 may not be required in some applications, and therefore not included in the contoured foam layer 126.

Figure 5:
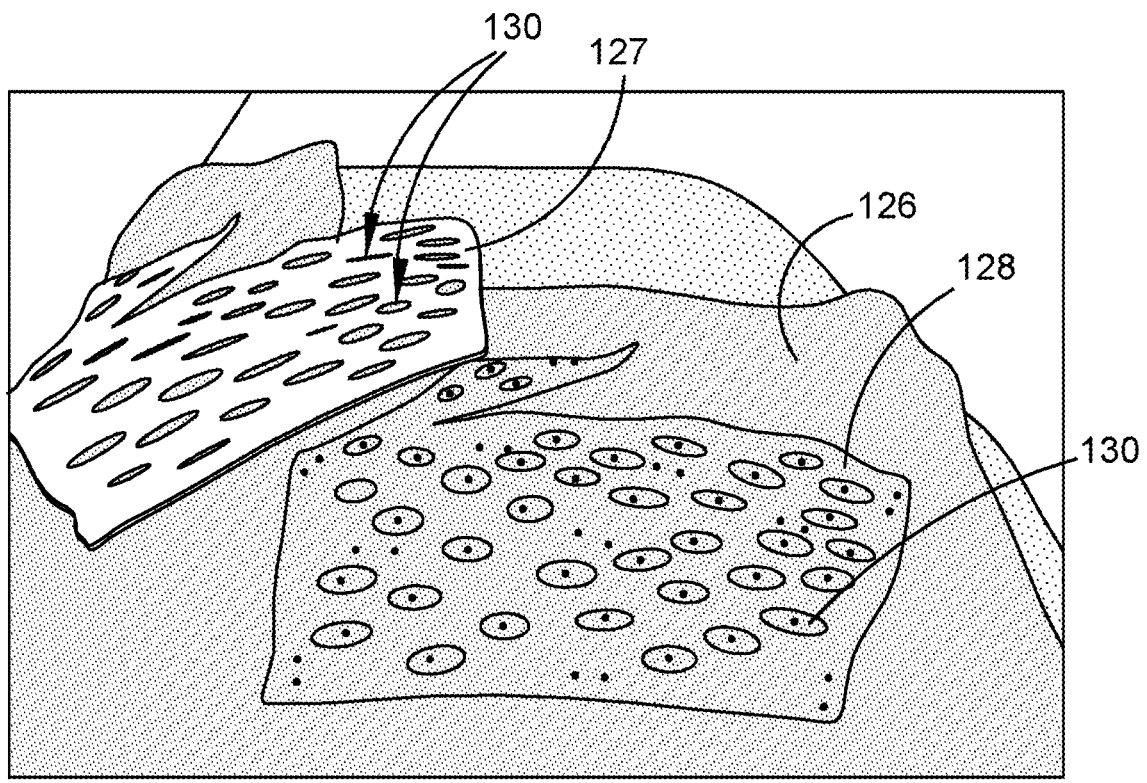
FIG. 5 illustrates the step of marking out a pattern on a contoured foam layer.
Figure 6:
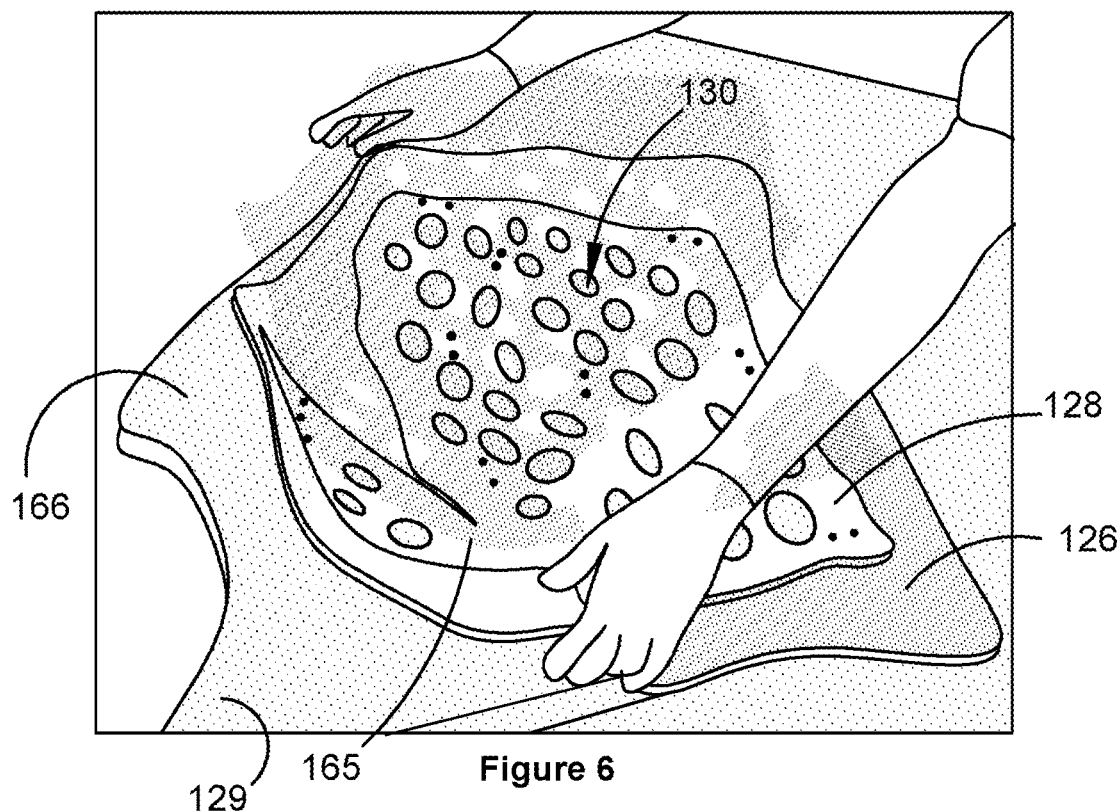
FIG. 6 illustrates the step of joining two foams comprising the contoured foam layer. It should be noted that the illustrated joining process can be done either inside the mould or outside the mould.
Figure 7:
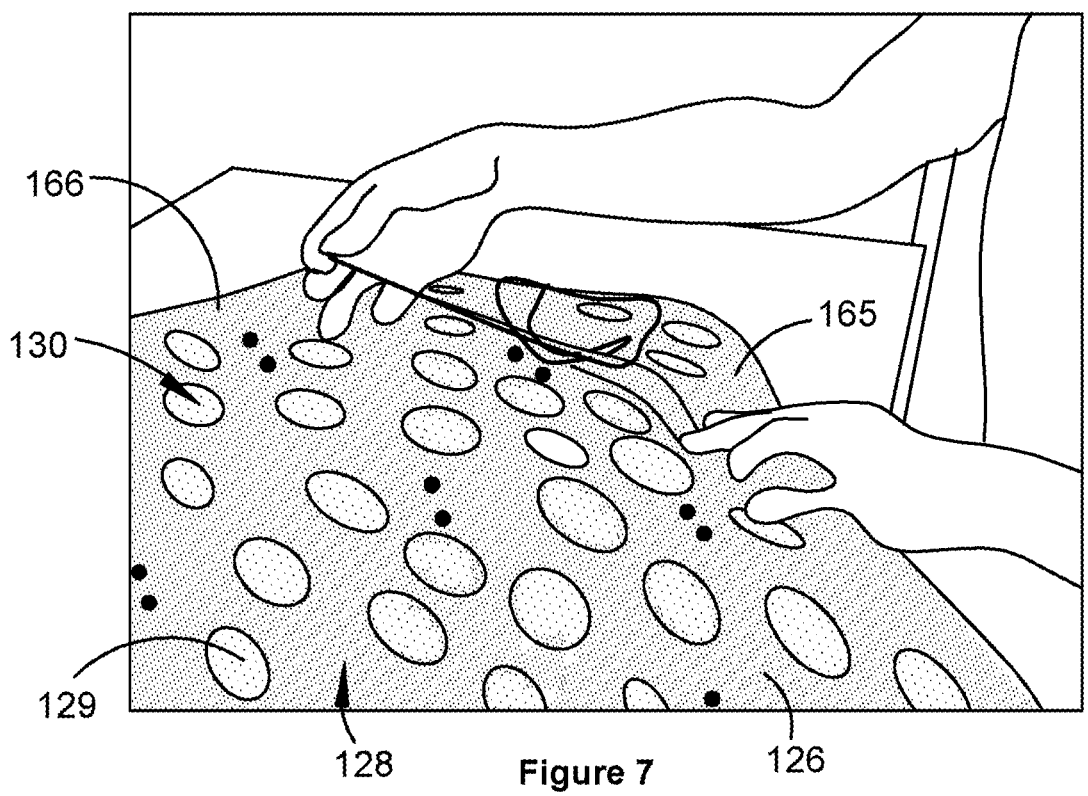
FIG. 7 illustrates the step of stitching the pattern of the contoured foam layer shown in FIG. 6. It should be noted that stitching may not be not appropriate in all situations and adhesives may suffice.

As shown in FIGS. 5 to 7, the illustrated contoured foam layer 126 comprises a laminated structure of two layers 128, 129 of reticulated foam. In the illustrated embodiment, the contoured foam layer 126 is formed from an articulation layer 128 formed from reticulated foam including a plurality of articulation apertures 130 (optional cheese ghosting, described below), and a backing layer 129 formed from reticulated foam onto which the articulation layer 128 is affixed.

The contoured foam layer 126 is formed by firstly marking out a pattern on the articulation layer 128 of reticulated foam (see FIG. 5) including the desired shape for forming the 3D contours of the foam preform 170 and the articulation apertures 130 or "cheese ghosting" of this layer. The articulation apertures 130 of the articulation layer 128 are cut out. The backing layer 129 (having a cooperating outer shape) is then aligned with the articulation layer 128. Where required, silicone infused mesh material (not illustrated in the Figures) is laid between the articulation layer 128 and backing layer 129 as reinforcement for any manipulation paddles and/or tethers that may be connected to that section 106 of the covering arrangement 100. The abutting sides of the articulation layer 128 and backing layer 129 are then sprayed with a light covering of silicone and, before the silicone has cured, laid together and compressed using a manual roller device, for example a rolling pin or similar, to ensure a positive connection. When the silicone has cured, the marked out pattern on the contoured foam layer 126 is cut out using a sharp scalpel, blade or the like.

Once the shape of the contoured foam layer 126 is cut out, the darts and pattern shapes are attended to by sewing or adhering complementary adjoining sections (for example sections 165 and 166 in FIGS. 6 and 7) of the contoured foam layer 126 together with strong thread (see FIG. 7).

Figure 8:
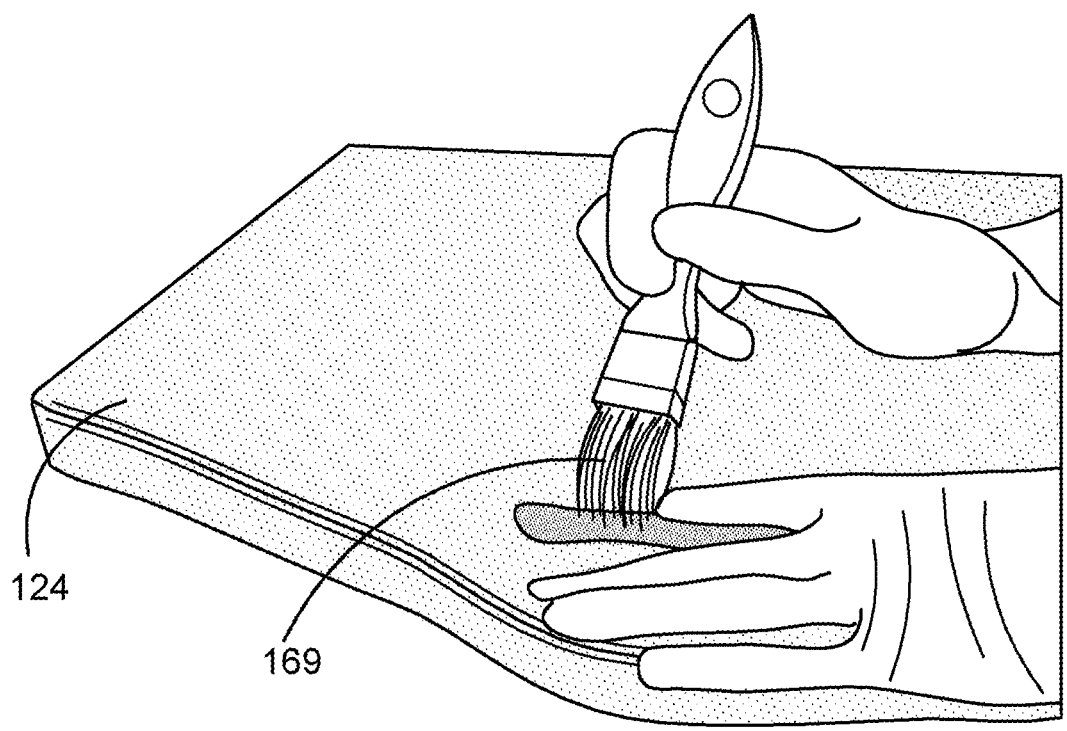
FIG. 8 illustrates the step of applying an adhesive on body foam layer for affixing to the contoured foam layer shown in FIG. 8.

The soft foam body layer 124 is then affixed to the contoured foam layer 126 using a contact adhesive 169 or silicone when applied as separates (see FIG. 8) to form the overall laminated foam preform 170. The contact adhesive 169 can comprise any suitable adhesive such as a resin or rubber of one or a combination of silicone, polychloroprene or the like, such as Anchor-weld scraper grade contact adhesive available from Bostik, Australia. The contact adhesive is allowed to fully cure.

Once the contact adhesive has cured, the stitch the foam preform 170 is affixed typically using temporary stitches or Velcro strips adhered to the press mould 144.

A light coat of silicone or other adhesive is applied to the complementary surfaces of the foam preform 170 in the press mould 144 and the reinforced outer layer 160 in the textured mould 142. The textured mould 142 and press mould 144 halves of mould 140 are closed and pressed together. The textured mould 142 and press mould 144 halves are secured together using a fastening arrangement (not illustrated), for the illustrated embodiment bolts (not illustrated) could be used. The laminated arrangement in the mould 140 is then allowed to cure.

Once cured, the laminated structure 105 of the covering arrangement section 106 is removed from the mould 140 by removing the temporary stitches on the press mould, and then releasing the covering arrangement section from the textured mould 142 and press mould 144 halves.

It should be appreciated that in some instances press moulding using the textured mould 142 and press mould 144 halves as a method of foam lamination may be substituted entirely by a vacuum bagging moulding process. Vacuum bagging can apply similar even pressure to the laminated structure 105 of the covering arrangement section 106 during the lamination curing time. However, it is to be understood that such substitution is only suited to shallow open moulds with less complicated contours.

Joining Covering Arrangement Sections

As noted above, the overall covering arrangement 100 of an articulated body/animatronic arrangement is manufactured from a plurality of individually formed sections 106 of covering arrangement 100 which are joined together once formed. Permanent joins are used to connect small sections 106 of the covering arrangement 100 to form larger section of the covering arrangement 100. The permanent joins are preferably located along a wrinkle line to minimise the visual/aesthetic impact of the join.

Figure 10:
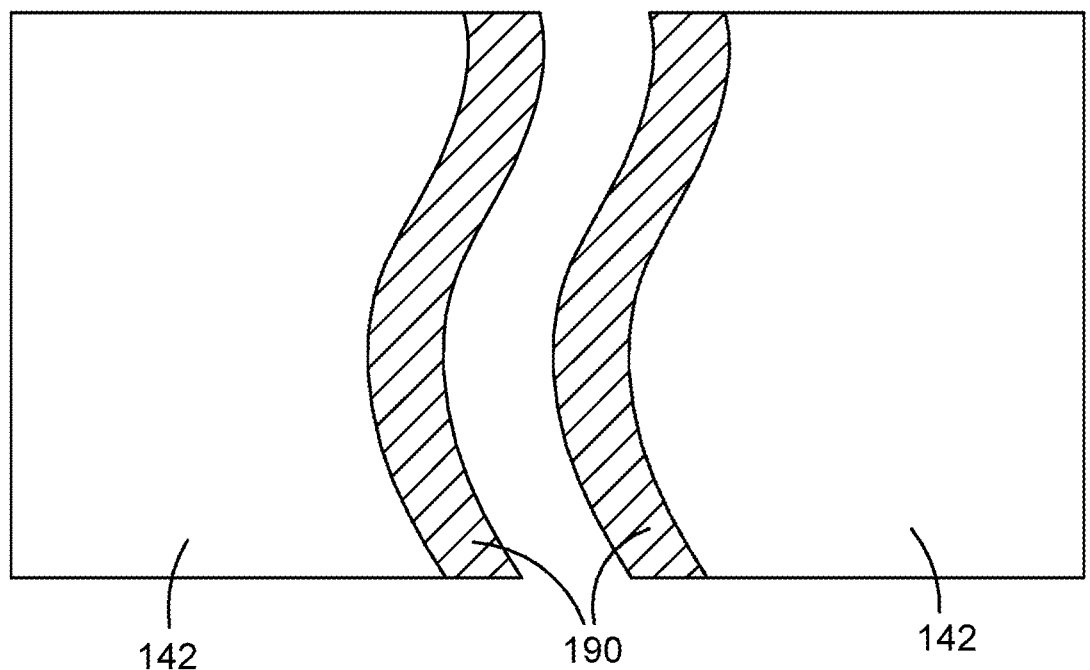
FIG. 10 illustrates the step of applying masking material/plastic to the relevant layer of covering arrangement when held in a mould.
Figure 11:
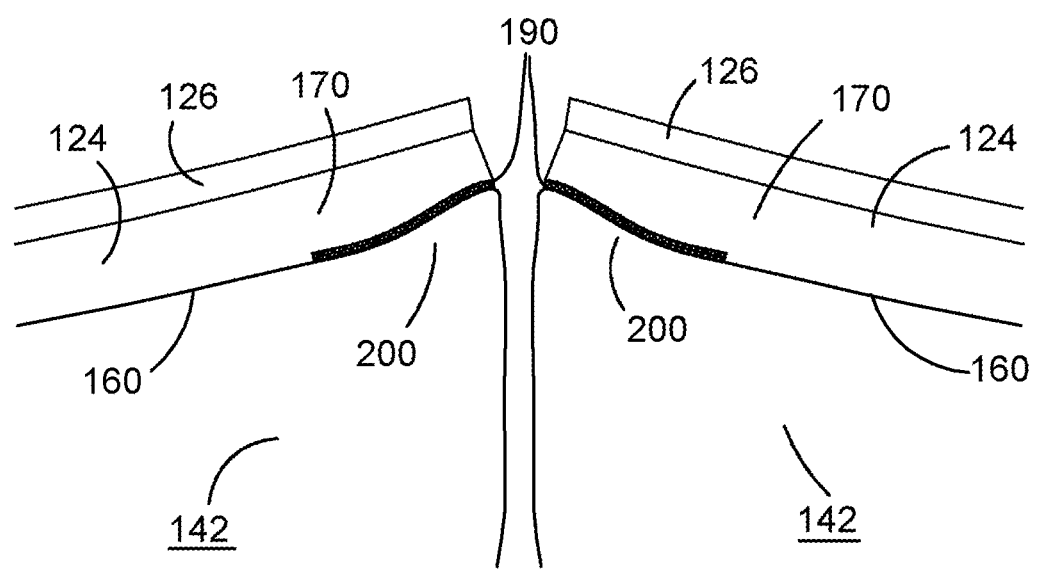
FIG. 11 provides a cross-sectional view of the covering arrangement with applied masking material/plastic as shown in FIG. 10.
Figure 12:
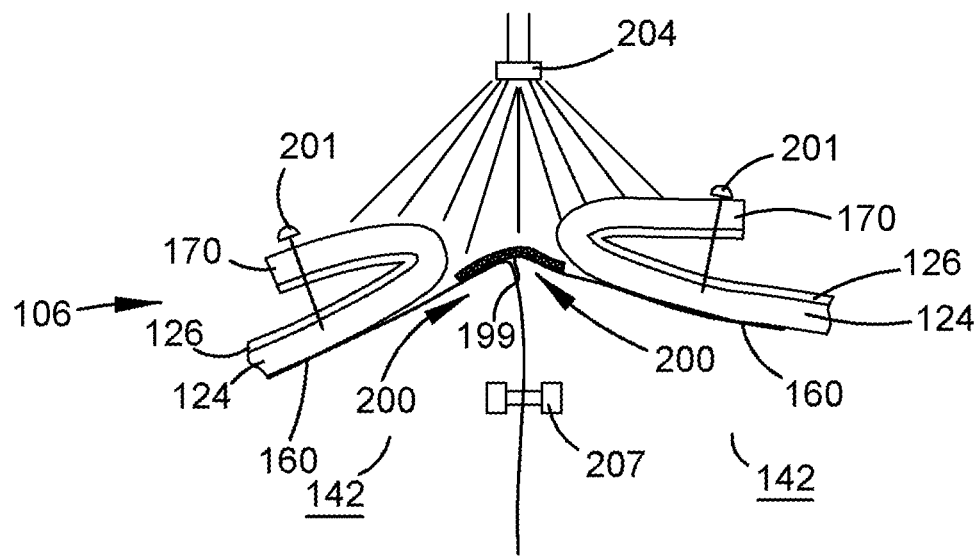
FIG. 12 shows the configuration of open join between two covering arrangement sections.

The construction of the covering arrangement sections 106 follows the same process as discussed previously, up to the point where the textured mould 142 and press mould 144 halves of the mould 140 are closed and pressed together. In this step, a 40 mm wide piece of masking fabric 190 is laid between the textured mould 142 and press mould 144 halves along the cooperating edges as shown in FIGS. 10 and 11. The mould 140 is secured and allowed to cure as noted in the previously described method. In this case, the masking plastic inhibits the bond between the adjoining surface of the foam preform 170 and reinforced outer layer 160. This enables this area to be rolled back revealing the join 199 and join line 205 for next step of joining the two covering arrangement sections 106. As illustrated in sequential FIGS. 11 to 13, this is achieved by:

Joining the two textured mould sections 142 using fasteners (not illustrated), such as bolt 207;

Peel back the area 200 of the foam preform 170 that remained unstuck due to the masking plastic 190 and affix open for example using a pin 201 to reveal the join 199 and associated join line 205 for each covering arrangement section 106 (FIG. 12);

Apply an adhesive 204, such as silicone thickened with "Thi-Vex" (a silicone Thixotropic agent) along the join line 205 of join 199 and allow to cure (FIG. 12);

Place a length of mesh material or net 210 which has been infused with silicone on top of and along the join line 205 to give the join 199 between each covering arrangement section 106 strength (FIG. 12);

Spray the exposed surfaces of the foam preform 170 and reinforced outer layer 160 about join 199 with an adhesive 204, such as silicone thickened with "Thi-Vex" and remove pins and allow the foam to return to join line 205. Press flat the join 199 and associated layers of the foam preform 170 and reinforced outer layer 160 (FIG. 12).

Figure 13:
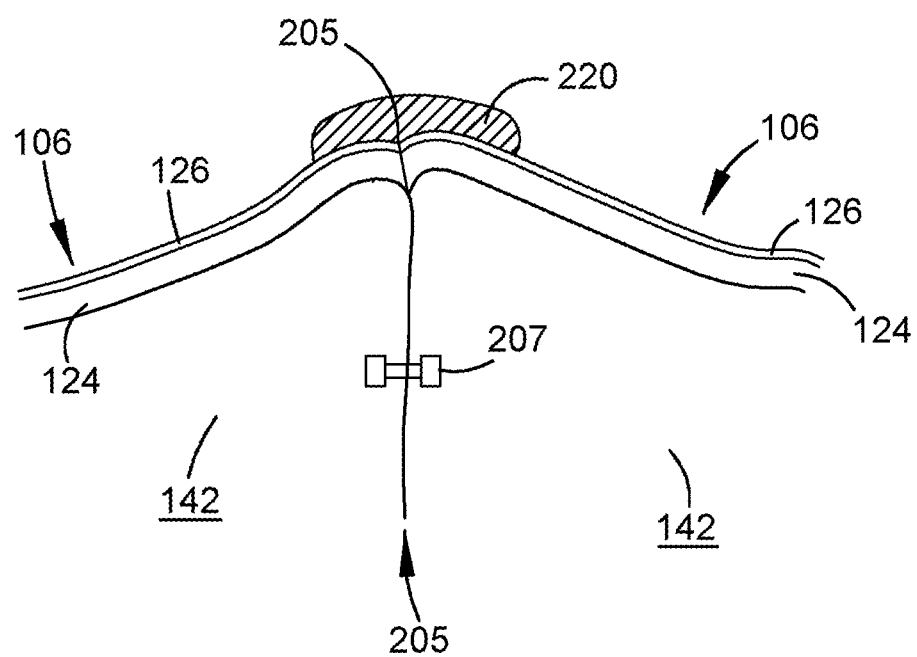
FIG. 13 shows the configuration of sealed and connected join between two covering arrangement sections.

Apply a weight 220 to the join 1999 to ensure positive contact (FIG. 13). Allow to cure.

Glue the adjoining body foam layers 124 together of the join 199 with contact adhesive, such as such as a resin or rubber of one or a combination of silicone, polychloroprene or the like and stitch or adhere the contoured foam layer 126 using a strong thread. Allow glue to cure (FIG. 13).

Release from mould 140.

Fur and Hair Knotting

Figure 14:
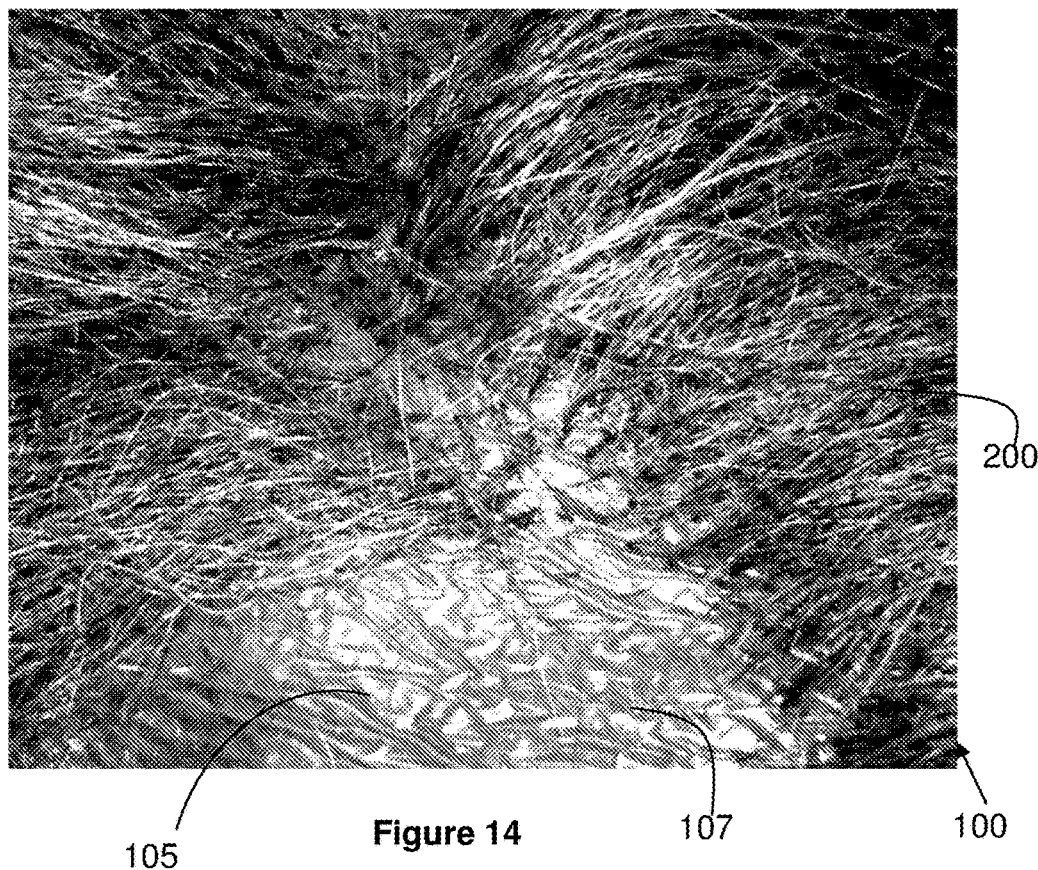
FIG. 14 provides a photograph of an example of this hair knotting configuration on the outer silicone layer.

The covering arrangement 100 of the present invention can be connected or joined to other covering materials. For example, in some embodiments, the covering arrangement 100 could include a fur portion. In some embodiments, the covering arrangement 100 can be connected to a fur material, for example a 4-way stretch fur supplied by National Fibre Technologies supported by power mesh. The fur can be in differing lengths and densities where desired. The connection typically comprises a transition region in the covering arrangement section so the present invention which includes hair fibres 200 implanted into the outer surface 107 of the outer stretchable polymer layer 105. This transition would typically comprise sparse hair knotted into the outer stretchable polymer layer 105. The individual fibres are punched (not stitched) into the silicone and knotted onto a backing fabric, in this case a layer of power mesh imbedded into the outer stretchable polymer layer 105 in the appropriate areas (as previously discussed). An example of this hair knotting configuration on the outer stretchable polymer layer 105 is shown in FIG. 14.

Repairs

The success of the repairs to the covering arrangement 100 of the present invention is due to the unique laminated structure of a thin silicone outer layer 105 (approx. 1 mm) on top of a structural foam sub-structure 120 of soft body foam 124 and contoured reticulated foam 126 which is supported with the optional reinforcing mesh material 112 (power mesh) in areas of high loads.

Tom skin may result from technician carelessness, vandalism or possibly from a mechanical failure. The repair approach to fixing it will vary depending on the extent of damage to the covering arrangement 100. The layers are repaired as follows:

The soft body foam 124 and contoured reticulated foam 126 are both glued together with contact glue.

The silicone outer layer 105 is repaired by applying a small amount of an adhesive such as "silpoxy" (see below) with a spatula or similar to both sides of the damaged silicone. A strong thread can be used to stitch the sides of the silicone together across the damaged section, using a similar technique as a surgeon would use to stitch a patients wound together.

Allow at least fifteen minutes for the adhesive to cure. When the adhesive has cured remove the stitches.

Figure 15:
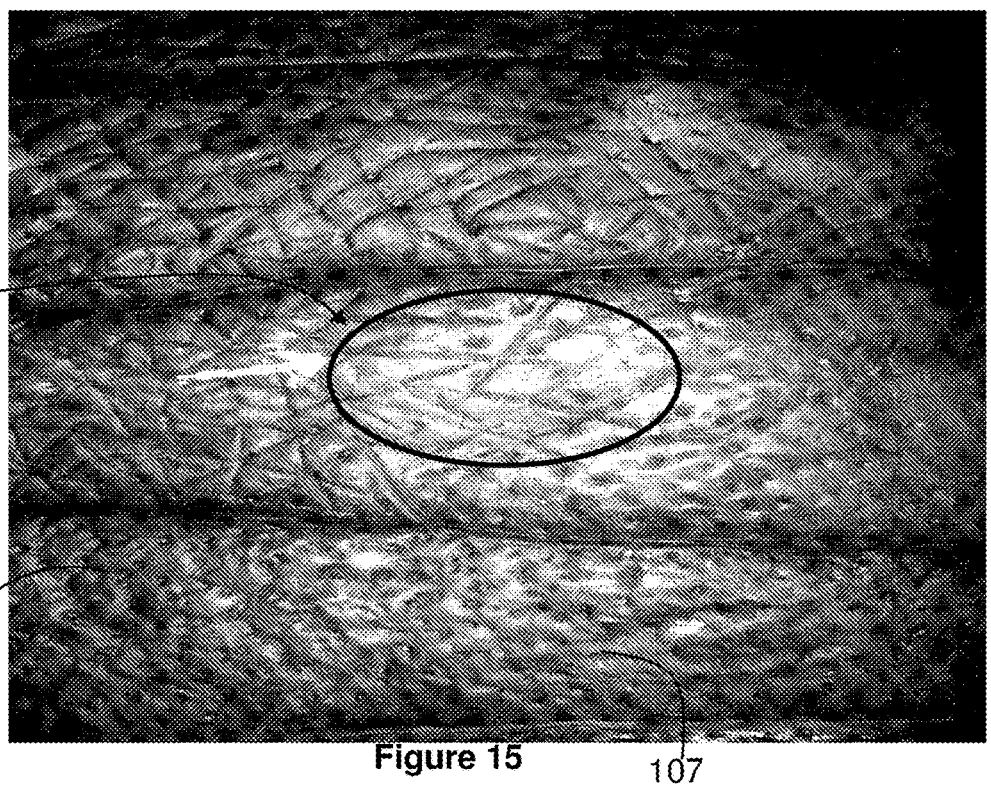
FIG. 15 provides a photograph of a sample of repaired three day old creature skin having a configuration according to the present invention.

FIG. 15 illustrates the morphology of a three day old sample skin of repaired covering arrangement 100 or sample skin having a structure according to the present invention. The sample skin was cut in the indicated area 210 and repaired from the surface following the method steps described above. Areas to be repaired were cleaned with isopropyl alcohol wipes and shellite to remove grease and dust. All silicone repairs were made using a silicone adhesive. One exemplary adhesive was "Silpoxy" adhesive available from Smooth-On, Easton Pa. 18042, United States of America which was found to be very effective. It should be appreciated that Silpoxy (or Sil-poxy) is a one component silicone adhesive made specifically for bonding RTV silicone rubber to silicone rubber and other substrates including some plastics (urethane), plasters/ceramics, fabrics, etc. Sil-Poxy provides a strong, flexible bond between silicone parts with high elongation. However, it should be appreciated that alternate silicone adhesives could equally be used for repairs.

Durability Testing

The durability of the covering arrangement 100 was tested to determine the impact of constant and continual movement thereon. Stretch, compression and abrasion are the typical areas of concern for longevity of any covering arrangement or skin of an articulated form. Accelerated testing rigs were used to explore the durability of various materials and combinations of materials. An example of a covering arrangement section 106 similar to as shown and described in relation to FIG. 1 is shown in a test rig 300 in FIG. 16. The test rig 300 comprises two spaced apart clamping arms 305 between which a sample is held. The arms 305 move to stretch and move the sample therebetween.

Testing Methodology

The testing method involved the following steps:

Apply stretch control matrix to the test fabric (i.e. covering arrangement 100);

Clamp the top and bottom of the test fabric in the test rig;

Set the speed for test;

Turn off the machine when count cycle has been reached;

Remove the fabric;

Inspect the condition of the test fabric; and

Check stretch control matrix against the matrix dots on fabric.

As can be appreciated, the testing process begins by testing covering arrangement 100 without any attachments before progressing to more complex combinations and variations, progressing from generic testing to testing specific areas of concern presented by the sculptural form and animation of the animated/articulated figure. Tested samples can also incorporate fixing methods to control surfaces, joins, and transitions and repairs systems.

An example test analysis and results is provided below. The aim of the example test run was to identify durability of the proposed skin covering arrangement and the impact of continual stretching by testing the stretch and adhesion capabilities of the composite skin. The test run conditions were as follows:

Apparatus:
Stretch machine (FIG. 19)—applying 25% stretch.
Sample/Test Piece:
A piece of covering arrangement measuring 25 cm×25 cm.
Method/Test Procedure:
These steps test the impact of constant and continual stretching on the composite skin.
1. Clamp the top and bottom of the test fabric in the test rig.
2. Set the speed for test in accordance with test sheet.
3. Run test machine for: Total cycles: 1,429,200 and Total Test Hours: 198.5.
4. Turn off the machine when count cycle has been reached.
5. Remove the fabric from the test rig.
6. Inspect the condition of the test fabric.

Figure 16:
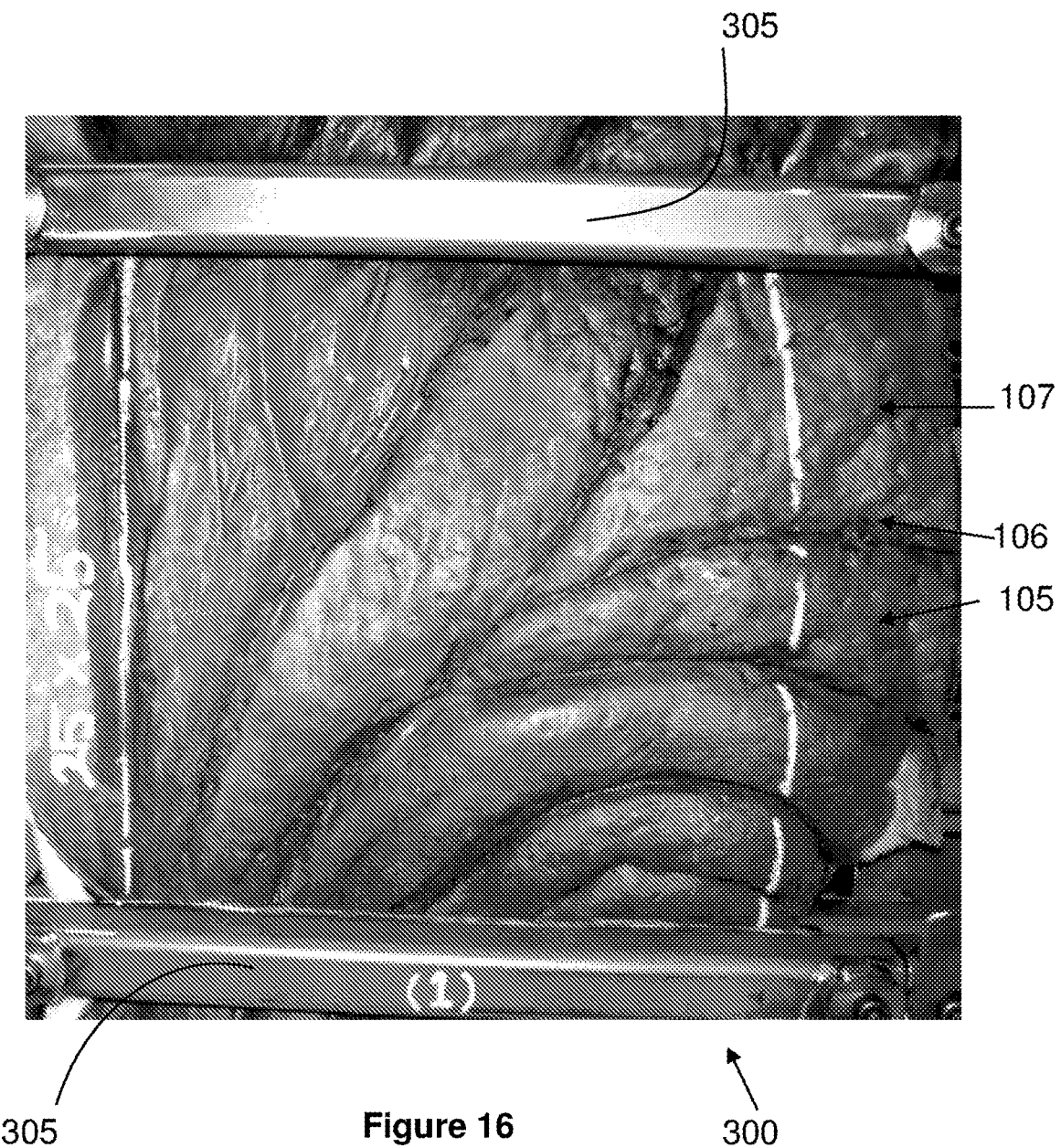
FIG. 16 provides a photograph of a skin sample mounted between the arms of a durability test rig.

The test piece of skin completed 1,429,200 cycles and as shown in FIG. 16 remained of an acceptable show quality (for example for use in an entertainment venue such as a theme park).

Another test piece of skin (not illustrated) completed 4,417,200 cycles and remained of an acceptable show quality. All the individual elements of the tested covering arrangement have performed above initial expectations.

The above described covering arrangement 100 provides a lightweight skin and coverings which provides a more dynamic and lifelike movement to an animatronic figure, as the covering is able to flex and move with more freedom compared to heavier conventional counterparts. The covering arrangement of the present invention also allow lighter and more dynamic underlying articulated bodies and structures to be built as the lightweight of the skin places less load requirement on members and articulation devices of the structure and framework of the articulated figure. Lightweight skins also provide for a much more serviceable Animated Figure (AF).

Moreover, when used in combination with other elements, such as Muscle bags, fur, paddle attachments and other articulated devices, the covering arrangement of the present invention combines to give an articulated or animated body covered with the inventive covering arrangement a light weight and flexible fabrication component thus allowing engineering to produce dynamic lifelike movements.

Furthermore, the described covering arrangement 100 is straightforward to repair if damages, with repairs to the foam layer 120 being glued and/or sewn to repair damage and, the stretchable polymer layer 105 being fixable using adhesive, or adhering a suitable silicone patch to the damaged section of the covering arrangement 100.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

APPENDIX 1 – Econo Foam MSDS

AN ACTIVITY OF JOYCE FOAM PTY LTD

HEAD OFFICE NSW
5-9 Bridges Road
Moorebank NSW 2170
ABN 21 116 491 635
Phone: 1800 021 304
Fax: 1800 807 158 www.joyce.com.au

Identification

| | | | Product |
|---|---|---|---|
| Product Name: | Econofoam, Living Comfort, Active Comfort, Premium Comfort Specialty Foam | U.N. Number | None |
| | | Dangerous Goods Class | |
| Other Names: | Flexible Polyurethane Form | and Subsidiary Risk | None |
| | Polyether-urethane Foam | Hazchem Code | None |
| | | Poisons Schedule | None |

Manufacturer's Codes:

E10-100, E16-100, E17-65, E19-130, E23-120, L10-25, L16-110, L19-130, L24-160, L27-210, N15-60
N17-80, N19-40, N20-100, N23-130, N24-115, N27-160, N30-130, N31-190, N31-320, H25-60, H28-80, H28-95, H28-120, H35-100, H35-130, H35-200, H42-500, U29-400.

Uses: Upholstery, Bedding, Packaging, Carpet Underlay.

*Physical Descriptions/Properties*

| | |
|---|---|
| Appearance: | Flexible, cellular structure, white to off white, natural colour, or Specified colour. (Shade will change slowly on exposure to air) |
| Boiling Point: | Not applicable. |
| Melting, Thermal Decomposition/Ranges: | 325-370°C |
| Vapour Pressure: | None |
| Percent Volatiles: | None |
| Specific Gravity: | Apparent density of 15-100kg/m$^3$ |
| Flash Point (°C): | >250°C |
| Flammability Limits: | Material can be ignited by an open flame or by a source for smouldering ignition. |
| Auto ignition Temperature(°C): | >260°C short term. Avoid long-term exposures over 135°C. |

Ingredients (includes all hazardous chemicals)

| Chemical Entity | CAS No. | Proportion |
|---|---|---|
| Polyurethane Foam | 9009-54-5 | 100% |

Note: As polyurethane foam is classified as an "article" it is not required to be listed on the Australian Inventory of Chemical Substances.

Health Hazard Information

| | |
|---|---|
| Health Effects:<br>essentially inert<br>be | None expected from normal handling. The polymer is<br>with low oral or dermal toxicity. Inhalation of foam dust should<br>avoided. Temperatures in excess of 135°C encountered in any<br>processing or other use will produce irritating or toxic fumes. |
| First Aid:<br>victim to<br><br>fume,<br>suitable | In case of overexposure to fumes, vapours or smoke, remove<br>fresh air. Render breathing assistance if needed and consult a<br>physician. In case of eye irritation from contact of foam dust,<br>vapour and smoke, flush with ample quantities of water or<br>eyewash for 15 minutes. Consult a physician. |

Precautions for Use

| | |
|---|---|
| Exposure Limits | Not applicable. |
| Ventilation | None required under normal conditions. Ventilation required where material is processed with flame or hot cutting wires. |
| Person Protection<br>Respiratory Protection<br>Protective Gloves<br>Eye Protection: | <br>None required unless fumes or dust is involved.<br>None required<br>As appropriate around moving machine parts during fabrication or if dust protection. |
| Flammability | The material should be kept away from sparks, smoker's materials, open flame and from excessive heat. Smoking should be forbidden in areas where material is stored or processed. Foam may burn rapidly with high heat and evolution of black smoke. Flammability ratings of small-scale laboratory tests are not to be taken as an indication of the material's behaviour in an actual full-scale fire. |

Safe Handling Information

| | |
|---|---|
| Storage & Transport | Maintain adequate fire protection where large volumes of foam are kept, eg. warehouse, fabrication areas and storage rooms. Check for compliance with insurance regulations, local building codes or other legal requirements. |
| Spills & Disposal | Waste may be shredded or baled for re-use.<br>Dispose or landfill or incineration as required by local or state regulation. |

| | |
|---|---|
| Fire/Explosion Hazard | If ignited the product may melt, producing flammable liquids. Burning produces toxic gases, such as carbon monoxide, oxides of nitrogen and hydrogen cyanide and intense heat, dense smoke. |
| Extinguishing media | Dry chemical, water, carbon dioxide. |
| Special fire fighting procedures | Wear self-contained breathing apparatus. |
| Other Information | Refer to Plastics Industry Association publication: "Flexible Polyurethane Foams - Its Uses and Misuses" |

Contact Point: (02) 9821 8777     Date: May 2013

The information supplied herein is presented in good faith and believed to be accurate to the best knowledge of the supplier.
However, since conditions of use are beyond our control we make no warranties, expressed or implied as to the use of this information or the suitability of the product for a particular purpose.

APPENDIX 2 - Reticulated foam MSDS

AN ACTIVITY OF JOYCE FOAM PTY LTD

HEAD OFFICE NSW
5-9 Bridges Road
Moorebank NSW 2170
ABN 21 116 491 635
Phone: 1800 021 304
Fax: 1800 807 158 www.joyce.com.au

MATERIAL SAFETY DATA SHEET

Identification

| | | | |
|---|---|---|---|
| Product Name: | Dricell, Meracell Reticulated Polyester/Polyether Foam | U.N. Number: | None |
| Other Names: | Flexible Polyurethane Foam Reticulated Polyurethane Foam | Dangerous Goods Class/and Subsidiary Risk: | None |
| | | Hazchem Code: | None |
| | | Poison's Schedule: | None |

Manufacturer's Codes:
N27-12OR, N31-20OR. S28/25R, S28/60R, S27/90R, N27/25R, N27/30R, N27/60R, N31/35R Uses: Air and liquid filters, speaker grilles, powder puffs, surge mitigation, fuel cell components.

Physical Descriptions/Properties
Appearance: Flexible, cellular structure, white to off white, natural colour, or specified colour. (Shade will change slowly on exposure to air)
Boiling Point: Not applicable
Melting, Thermal Decomposition ranges: 300 - 350°C
Vapour Pressure: None
Percent Volatiles: None
Specify Gravity: Apparent density of 15 - 100 kg/m$^3$
Flash Point (°C): >250°C
Flammability Limits: Material can be ignited by an open flame or by a source for smouldering ignition.
Autoignition Temperature (°C): >260°C short term. Avoid long-term exposures over 135°C.

Ingredients (includes all hazardous chemicals)
| Chemical Entry | CAS No. | Proportion |
|---|---|---|
| Polyurethane Foam | 9009-54-5 | 100% |

Note: As polyurethane foam is classified as an "article" it is not required to be listed on the Australian Inventory of Chemical Substances.

Health Hazard Information

Health Effects: None expected from normal handling. The polymer is essentially inert with low oral or dermal toxicity. Inhalation of foam dust should be avoided. Temperatures in excess of 135° encountered in any processing or other use will produce irritating or toxic fumes.

| | |
|---|---|
| First Aid: | In case of overexposure to fumes, vapours or smoke, remove victim to fresh air. Render breathing assistance if needed and consult a physician. In case of eye irritation from contact of foam, dust, fume, vapour and smoke, flush with ample quantities of water of suitable eyewash of 15 minutes. Consult a physician. |

Precautions for Use

| | |
|---|---|
| Exposure Limits | Not applicable. |
| Ventilation | None required under normal conditions. Ventilation required where material is process with flame or hot cutting wires. |
| Personal Projection | |
| Respiratory Projection: | None required unless fumes or dust is involved. |
| Protective Gloves: | None required. |
| Eye Protection: | As appropriate around moving machine parts during fabrication or if dust protection required. |
| Flammability | The material should be kept away from sparks, smokers' materials, open flame and from excessive heat. Smoking should be forbidden in areas where material is stored or processed. Foam may burn rapidly with high heat and evolution of black smoke. Flammability ratings of small-scale laboratory tests are not to be taken as an indication of the material's behaviour in an actual full-scale fire. |

Safe Handling Information

| | |
|---|---|
| Storage & Transport: | Maintain adequate fire protection where large volumes of foam are kept eg. Warehouse, fabrication areas and storage rooms. Check for compliance with insurance regulations, local building codes or other legal requirements. |
| Spills & Disposal: | Waste may be shredded or baled for re-use. Dispose or landfill or incineration as required by local or state regulation. |
| Fire/Explosion Hazard: | If ignited the produce may melt, producing flammable liquids. Burning produces toxic gases, such as carbon monoxide, oxides of nitrogen and hydrogen cyanide and intense heat, dense smoke. |
| Extinguishing media: | Dry chemical, water, carbon dioxide. |
| Special fire fighting procedures: | Wear self-contained breathing apparatus. |

Other Information:    Refer to Plastics Industry Association publication:
* "Flexible Polyurethane Foams – Its Uses and Misuses"

Contact Point: (02) 9821 8777    Date: May 2012

The information supplied herein is presented in good faith and believed to be accurate to the best knowledge of the supplier.
However, since conditions of use are beyond our control we make no warranties, expressed or implied as to the use of this information or the suitability of the product for a particular purpose.

The invention claimed is:

1. A combination comprising a greater than human sized animatronic arrangement and a covering arrangement having a moulded laminated structure configured to cover the greater than human sized animatronic arrangement, wherein the covering arrangement comprises:
an outer stretchable polymer layer having a thickness of between 0.5 to 5 mm; and
a foam layer configured to provide desired bulk and form to the covering arrangement, wherein the foam layer comprises a shaped foam preform formed from precast flexible foam sheets, the shaped foam preform comprising a combination of at least two foam layers comprising:
at least one body layer comprising a stretchable foam adapted to provide the form and configuration of the foam layer; and
at least one contoured foam layer comprising a reticulated polymer foam adapted to provide shape and stiffness to the foam layer;
wherein the covering arrangement is configured to be flexed or moved by the greater than human sized animatronic arrangement; and,
wherein the out stretchable polymer layer comprises: a tensile strength of 475 psi, as measured according to ASTM D-412; a die B tear strength of 102 pli, as measured according to ASTM D-624; a 100% modulus of 22 psi, as measured according to ASTM D-412; and, and elongation at break of 1000%, as measured according to ASTM D-412.

2. The combination according to claim 1, wherein the outer stretchable polymer layer comprises a silicone material.

3. The combination according to claim 1, wherein the at least one body layer comprising a stretchable foam comprises a polyurethane foam; and the at least one contoured foam layer comprising a reticulated polymer foam comprises a polyurethane foam.

4. The combination according to claim 1, wherein the contoured foam layer comprises at least two or more shaped sections joined together to provide the foam layer with a selected form and configuration.

5. The combination according to claim 1, wherein the contoured foam layer includes at least one articulation aperture located within each shaped section.

6. The combination according to claim 1, wherein the contoured foam layer comprises a laminated structure of two affixed layers comprising an articulation layer formed from reticulated foam including a plurality of articulation apertures, and a backing layer formed from reticulated foam onto which the articulation layer is affixed.

7. The combination according to claim 1, wherein the covering arrangement includes a connection section that is connectable to at least one fastening or manipulation device, the covering arrangement including at least one section of mesh material on the outer stretchable polymer layer positioned in a location that reinforces the portion of the connection section proximate the outer stretchable polymer layer.

8. The combination according to claim 1, further including at least one section of mesh material positioned to reinforce at least one portion of the outer stretchable polymer layer that includes ridges or folds in the outer stretchable polymer layer.

9. The combination of claim 1, wherein the outer stretchable polymer layer comprises one or more peak lines that define lines of articulation of the outer stretchable polymer layer.

10. A method of forming at least one section of a covering arrangement for a greater than human sized animatronic arrangement configured to cover a greater than human sized animatronic arrangement, the method comprising:
forming an outer stretchable polymer layer having a thickness of between 0.5 to 5 mm in a mould, the outer stretchable polymer layer having an outer surface and an inner surface;
forming a foam preform having a desired form and bulk suitable for a selected section the covering arrangement, the foam layer comprising a shaped foam preform formed from precast flexible foam sheets comprising a combination of at least two foam layers comprising:
at least one body layer comprising a stretchable polymer foam adapted to provide the form and configuration of the foam layer; and
at least one contoured foam layer foam comprising a reticulated polymer foam adapted to provide shape and stiffness to the foam layer; and
adhering the foam preform to the inner surface of the outer stretchable polymer layer, thereby forming a section of the covering arrangement; and
wherein forming an outer stretchable polymer layer comprises forming an outer stretchable polymer layer so as to have: a tensile strength of 475 psi, as measured according to ASTM D-412; a die B tear strength of 102 pli, as measured according to ASTM D-624; a 100% modulus of 22 psi, as measured according to ASTM D-412; and, an elongation at break of 1000%, as measured according to ASTM D-412.

11. The method according to claim 10, wherein the mould comprises a textured mould having textured mould surfaces formed which provide desired texture and shape to outer surface of the outer stretchable polymer layer.

12. The method according to claim 10, wherein the stretchable polymer layer is applied to the mould using a spray applicator.

13. The method according to claim 10, wherein the step of forming an outer stretchable polymer layer in a mould comprises:
coating the inner mould surface of the mould with a stretchable polymer pigment thereby forming a colour coated mould surface; and
applying a stretchable polymer layer to the mould including the colour coated mould surface; and
drying the resulting coloured stretchable polymer layer.

14. The method according to claim 10, further including the step of:
adhering at least one section of mesh material to the inner surface of the outer stretchable polymer layer positioned to reinforce at least one portion of the outer stretchable polymer layer to form, in combination with the outer stretchable polymer layer, a reinforced outer layer, and
thereafter adhering the foam preform to the reinforced outer layer to form a section of the covering arrangement.

15. The method according to claim 14, wherein the step of adhering at least one section of mesh material comprises:
infusing the mesh material with stretchable polymer; and
mounting the mesh material to at least one portion of the inner surface of the outer stretchable polymer layer.

16. The method according to claim 10, wherein the step of forming the foam preform comprises:
   laminating together at least one soft foam body layer for providing the form and configuration of the foam layer and at least one contoured foam layer for providing shape and stiffness to the foam layer.

17. The method according to claim 16, wherein the contoured foam layer is formed from a pattern including two or more interconnecting sections which are stitched together to form a contoured layer.

18. The method according to claim 16, wherein the step of forming the foam preform further comprises:
   forming the contoured foam layer from two or more layers of reticulated foam, the layers including at least one articulation layer including a plurality of articulation apertures, and at least one backing layer onto which the articulation layer is affixed.

* * * * *